(12) United States Patent
Grosz et al.

(10) Patent No.: US 6,838,032 B2
(45) Date of Patent: Jan. 4, 2005

(54) METHODS OF MANUFACTURING PERSONAL CARE PRODUCTS

(75) Inventors: Ron Grosz, Andover, MA (US); Michael J. Moloney, Brimfield, MA (US); David Blanchette, Methuen, MA (US); Robert Kleinrath, Hanover, MA (US); James L. Solan, Rockville, MD (US); Hermes van der Lee, Ashton, MD (US); Cheryl L. Galante, Marshfield, MA (US)

(73) Assignee: The Gillette Company, Boston, MA (US)

( * ) Notice: Subject to any disclaimer, the term of this patent is extended or adjusted under 35 U.S.C. 154(b) by 320 days.

(21) Appl. No.: 09/784,493

(22) Filed: Feb. 15, 2001

(65) Prior Publication Data

US 2002/0109262 A1 Aug. 15, 2002

(51) Int. Cl.⁷ .......................... B29C 39/10; B29C 39/12

(52) U.S. Cl. ................ 264/247; 264/254; 264/261; 264/267; 264/279

(58) Field of Search ............................ 264/245, 246, 264/247, 254, 255, 260, 261, 267, 268, 271.1

(56) References Cited

U.S. PATENT DOCUMENTS

| | | | |
|---|---|---|---|
| 27,864 A | 11/1860 | Blackman | |
| 692,481 A | 2/1902 | Robinson | |
| 964,422 A | 7/1910 | Hood | |
| 1,669,016 A | 5/1928 | O'Neil | |
| 1,791,359 A | 2/1931 | Henriksen | |
| 2,101,540 A | 12/1937 | Gullich | |
| 2,165,420 A | 7/1939 | Siefert | |
| 2,174,779 A | 10/1939 | Delorme | |
| 2,613,185 A | 10/1952 | Marshall | |
| 2,970,083 A | 1/1961 | Bell | ............................ 167/90 |
| D201,229 S | 5/1965 | Burke | |
| 3,192,933 A | 7/1965 | Prince | |
| 3,294,692 A | 12/1966 | Kelly et al. | |
| 3,479,429 A | 11/1969 | Morshauser et al. | |
| 3,972,974 A | * 8/1976 | Pico | .......................... 264/267 |
| 4,120,948 A | * 10/1978 | Shelton | ...................... 424/66 |
| 4,202,879 A | 5/1980 | Shelton | ...................... 424/66 |
| 4,366,038 A | * 12/1982 | Kearney et al. | ........ 204/403.02 |
| 4,393,643 A | 7/1983 | Fryar | ........................ 53/471 |
| 4,511,552 A | 4/1985 | Cox | |
| 4,518,553 A | * 5/1985 | Yarossi et al. | .............. 264/234 |
| 4,524,062 A | 6/1985 | Laba et al. | |
| 4,578,207 A | 3/1986 | Holdt et al. | |

(List continued on next page.)

FOREIGN PATENT DOCUMENTS

| | | |
|---|---|---|
| DE | 946 257 | 7/1956 |
| DE | 199 21 183 A 1 | 5/1999 |
| FR | 977194 | 3/1951 |
| FR | 2 770 199 | 4/1999 |
| GB | 2014507 A | 2/1979 |
| GB | D2081820 | 7/1999 |
| WO | WO 99/23998 | 5/1999 |
| WO | WO 00/19861 | 4/2000 |
| WO | WO 01/91605 | 12/2001 |

OTHER PUBLICATIONS

The Body Shop Skin & Hair Care Products catalog holiday edition c 1995; p. 16 makeup indicated by arrows.
"Bac deo–stick", undated.
"Bac deo–stick" undated.

Primary Examiner—Edmund H. Lee
(74) Attorney, Agent, or Firm—Fish & Richardson P.C.

(57) ABSTRACT

Methods are provided for manufacturing an antiperspirant product that includes an application surface having two portions having different compositions, e.g., a product having two sections having the same composition but separated by a third section (for instance, a central stripe) having a different composition.

31 Claims, 24 Drawing Sheets

U.S. PATENT DOCUMENTS

| | | | |
|---|---|---|---|
| 4,714,085 A | 12/1987 | Von Kleinsorgen | |
| 4,743,443 A | 5/1988 | Pisani et al. | |
| 4,786,449 A | 11/1988 | Smit | |
| 4,879,063 A | 11/1989 | Wood-Rethwill et al. | |
| 5,043,114 A * | 8/1991 | Saito et al. | 264/46.6 |
| 5,217,639 A | 6/1993 | Mottola | |
| D344,154 S | 2/1994 | Mottola | |
| 5,330,751 A | 7/1994 | Curtin et al. | |
| 5,411,300 A | 5/1995 | Mitsui | 285/292 |
| 5,417,964 A | 5/1995 | Carlson, Sr. et al. | |
| 5,429,397 A | 7/1995 | Kanao | 285/288 |
| 5,447,341 A | 9/1995 | Hartel et al. | 285/238 |
| 5,453,088 A | 9/1995 | Boudewijn et al. | 604/43 |
| 5,538,161 A | 7/1996 | Koehler et al. | |
| 5,568,949 A | 10/1996 | Andre | 285/284 |
| 5,587,153 A | 12/1996 | Angelone, Jr. et al. | |
| 5,643,467 A * | 7/1997 | Romanco | 210/767 |
| 5,705,171 A | 1/1998 | Iovanni et al. | |
| 5,759,974 A | 6/1998 | Menke et al. | |
| 5,947,621 A | 9/1999 | Szekely | |
| 5,965,501 A | 10/1999 | Rattinger | |
| 5,984,553 A | 11/1999 | Piscopo et al. | |
| D423,713 S | 4/2000 | Szekely | |
| 6,085,759 A | 7/2000 | Joulia | |
| D430,346 S | 8/2000 | van der Hagen | |
| 6,096,296 A | 8/2000 | Alflen et al. | |
| D443,951 S | 6/2001 | Look | |
| D444,264 S | 6/2001 | Look | |
| D444,265 S | 6/2001 | Look | |
| D444,593 S | 7/2001 | Look | |
| D444,913 S | 7/2001 | Look | |
| D446,356 S | 8/2001 | Look | |
| D446,606 S | 8/2001 | Look | |
| D446,607 S | 8/2001 | Look | |
| D454,227 S | 3/2002 | Look | |
| D454,228 S | 3/2002 | Look | |
| D454,229 S | 3/2002 | Look | |
| D454,414 S | 3/2002 | Look | |
| D454,661 S | 3/2002 | Look | |
| D454,662 S | 3/2002 | Look | |
| D454,663 S | 3/2002 | Look | |
| D454,664 S | 3/2002 | Look | |
| D454,665 S | 3/2002 | Look | |
| D454,666 S | 3/2002 | Look | |
| D454,983 S | 3/2002 | Look | |
| D454,984 S | 3/2002 | Look | |
| D454,985 S | 3/2002 | Look | |
| 6,648,026 B2 | 11/2003 | Look et al. | |
| 2002/0041788 A1 | 4/2002 | Look et al. | |

* cited by examiner

METHODS OF MANUFACTURING PERSONAL CARE PRODUCTS

TECHNICAL FIELD

This invention relates to methods of manufacturing antiperspirant products.

BACKGROUND

Antiperspirant compositions are well known personal care products. The compositions come in a variety of forms and may be formulated, for example, into aerosols, pumps, sprays, liquids, roll-on, lotion, creams, and sticks (both hard and soft), etc.

There are various types of stick antiperspirant compositions. In one type, an antiperspirant salt is suspended in an anhydrous vehicle often including a solid water-insoluble wax. In a second type, an antiperspirant salt is dissolved in a liquid vehicle such as propylene glycol and gelled with a gelling agent such as dibenzylidene sorbitol. A third type includes an emulsion of an aqueous phase containing the antiperspirant salt and an oil phase containing, for example, a volatile silicone, fragrances, gellants, and other additives.

Cosmetic sticks including an antiperspirant portion and a deodorant portion are known in the art. See U.S. Pat. Nos. 4,202,879; 4,120,948; and 2,970,083.

SUMMARY

Generally, the invention relates to methods of manufacturing an antiperspirant or deodorant product that includes an application surface having two portions having different compositions. The term "portion", as used herein, includes a section or sections of the application surface having the same composition; for example, two sections having the same composition but separated by a third section (for instance, a central stripe) having a different composition constitute a single "portion".

A composition including two different portions provides flexibility in designing the product. For example, the two portions may include different antiperspirant salts, or different quantities of the same antiperspirant salt. Alternatively, a multiple-portion product allows ingredients that generally should be kept apart to be incorporated into the same product. For example, one portion may include an antiperspirant salt while a second portion includes a fragrance that is incompatible with the antiperspirant salt. Moreover, one portion may be firmer or stronger than, and provide support for, the other portion.

Multiple portion antiperspirant and/or deodorant products also provide the option of selecting from a number of aesthetically pleasing design choices. One portion can be clear and the other portion opaque. Moreover, the first portion and the second portion may have different colors, thus providing for a way to provide a composition including one or more stripes. "Different color", as used herein, includes different shades of a color. In addition, white and black are considered colors.

Two portion antiperspirant and/or deodorant products are described in copending application U.S. Ser. No. 09/784,487 now U.S. Pat. No. 6,723,269, filed the same day as the present application and commonly owned with the present application, the disclosure of which is incorporated by reference herein.

The invention features methods of manufacturing two portion antiperspirant and deodorant products. There are a number of different aspects of the invention.

In one aspect, the invention features a method of manufacturing an antiperspirant or deodorant product within a container having an application end and an opposite end, the product having an application surface adjacent the application end. The method includes (a) delivering a first fluid composition through the opposite end of the container to a mold cavity that is defined at least in part by the container, the mold cavity including a removable insert; (b) allowing the first composition to at least partially solidify; (c) removing the insert from the mold cavity to provide a space; and (d) delivering a second fluid composition to the space that was occupied by the insert. Preferably, a first portion of the mold cavity defines an application surface of the product, which may be generally dome-shaped. The first portion of the mold cavity may include a factory seal portion of the container.

In another aspect, the invention features a method of manufacturing an antiperspirant or deodorant product having a generally dome-shaped application surface, the method including (a) delivering a first fluid composition to an open end of a mold cavity, a first portion of the mold cavity defining the dome-shaped application surface, the mold cavity including a removable insert, (b) allowing the first composition to at least partially solidify; (c) removing the insert from the mold cavity to provide a space; and (d) delivering a second fluid composition to the space that was occupied by the insert.

In a further aspect, the invention features a method of manufacturing an antiperspirant or deodorant product having a generally dome-shaped application surface including first and second portions, the method including: (a) delivering a fluid first composition to an open end of a mold cavity, a first portion of the mold cavity defining the dome-shaped application surface, the mold cavity including an insert constructed to extend from the first portion into the mold cavity towards the open end, and (b) allowing the first composition to at least partially solidify.

The invention also features a method of manufacturing an antiperspirant or deodorant product having an application surface including first and second portions, the method including: (a) delivering a first fluid composition to a mold cavity to form the first portion, the mold cavity including a removable insert, (b) allowing the first composition to at least partially solidify; (c) removing the insert from the mold cavity to provide a space; and (d) delivering a second fluid composition to the space that was occupied by the insert, to form the second portion, the second portion substantially separating two regions of the first portion.

"Within the container", as used herein, means that at least part of the composition is within the container; for example, when the upper end of the composition including the application surface extends above the container the composition still is considered "within the container". "Solidify", as used herein, encompasses fluids that solidify, for example, when cooled and gels that flow (i.e., are fluid) under pressure but then become substantially solid once the requisite pressure to flow is removed.

Other features and advantages of the invention will be apparent from the description and drawings, and from the claims.

DETAILED DESCRIPTION

Figure 1:
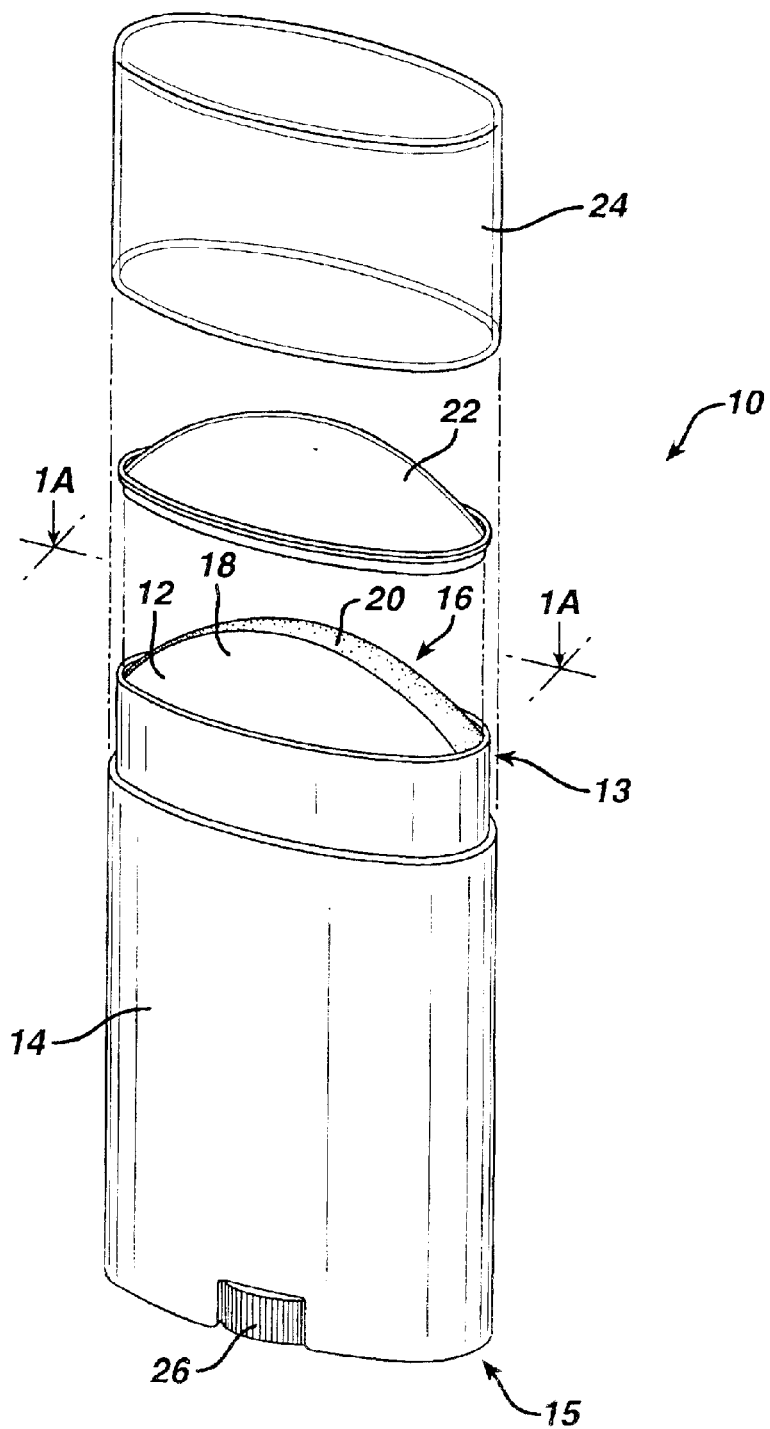
FIG. 1 is an exploded perspective view of an antiperspirant product.
Figure 1A:
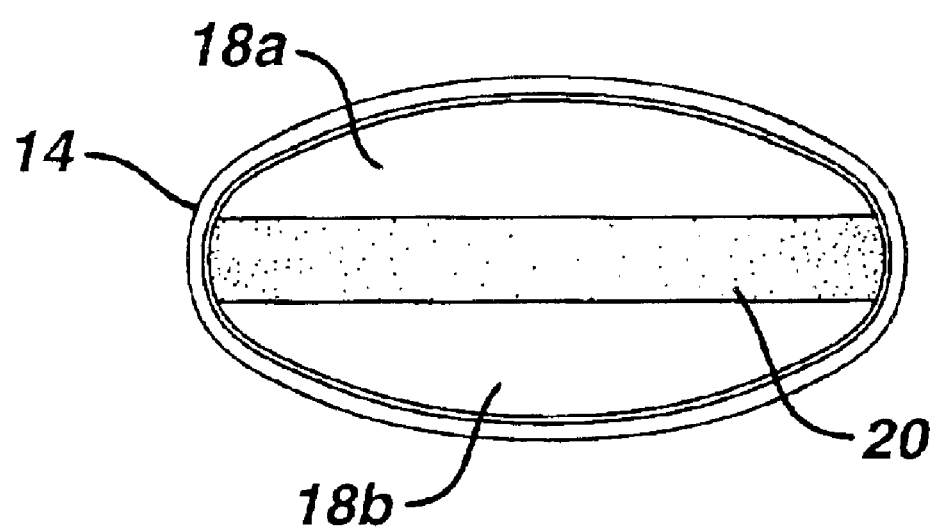
FIG. 1A is a top plan view of the product application surface, as indicated by view line 1A—1A in FIG. 1.

Referring to FIG. 1, an antiperspirant product 10 includes an antiperspirant stick 12 within a container 14. Container 14 has an application end 13 and an opposite end 15. The antiperspirant stick 12 has a generally dome-shaped application surface 16, and consists of a first portion 18 having a first color, and a second portion 20 having a second color. As shown in FIG. 1A, the first portion 18 is separated by the second portion 20 into two substantially separate regions 18A, 18B. In this embodiment, the second portion 20 defines a strip that extends substantially centrally through the first portion 18.

The antiperspirant product 10 also includes a factory seal 22, which is placed over the application surface 16 to protect it during shipment and to render it tamper-proof prior to purchase, and a cover 24. The factory seal 22 is removed by the user, and the cover 24 is used during storage of the product between uses. As the product is exhausted, it is advanced from the container by the user using advancement device 26, e.g., a screw mechanism as shown, at opposite end 15 of container 14.

A process for manufacturing the product shown in FIG. 1 is shown in FIGS. 2–11. Using this process, the antiperspirant stick is molded directly within the container, using the container as a mold cavity for the antiperspirant compositions, and delivering fluid (e.g., molten composition or flowing gel) antiperspirant compositions to the container 14 through opposite end 15, with opposite end 15 left open during the molding process and factory seal 22 in place to serve as the bottom of the mold cavity.

Figure 2:
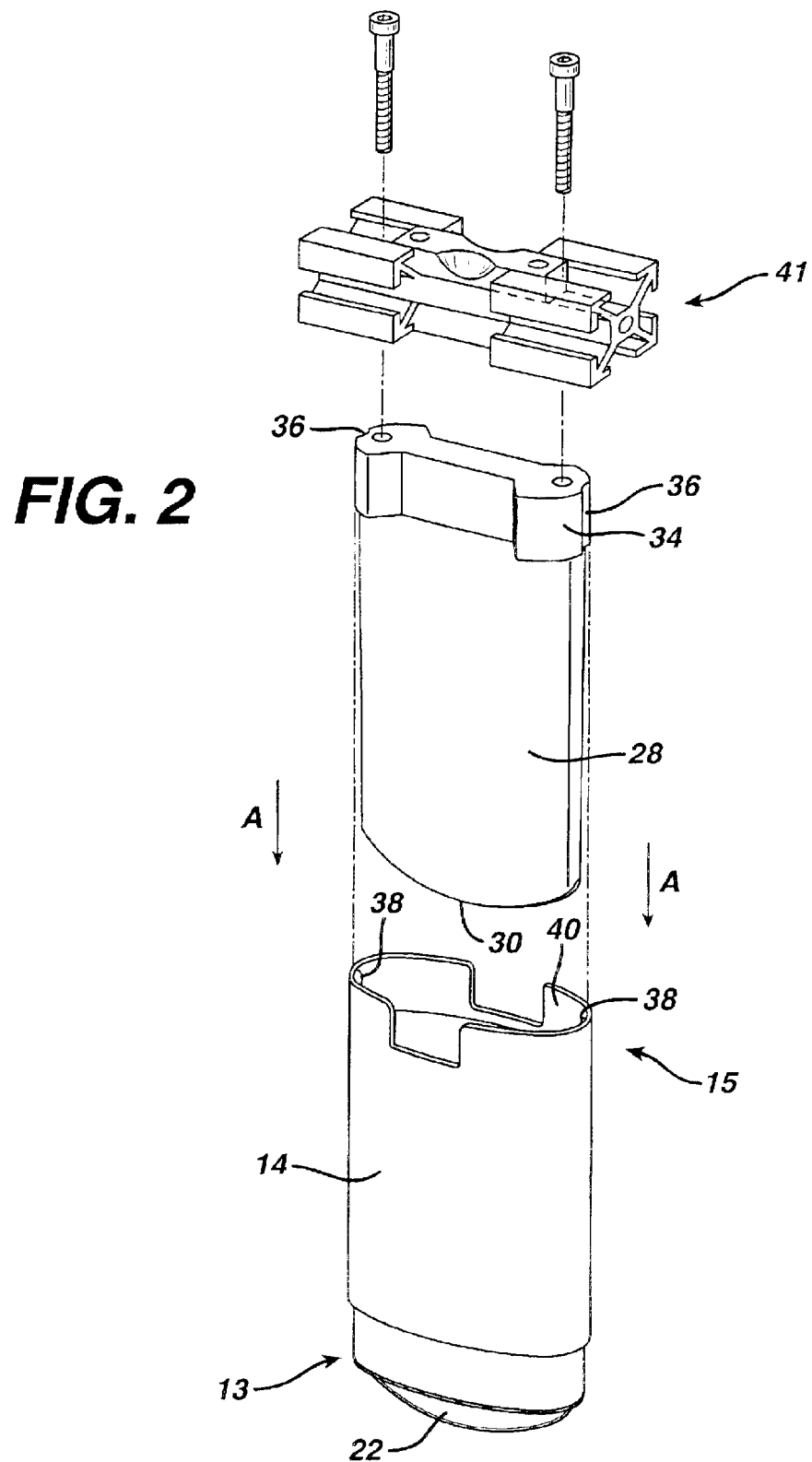
FIGS. 2–3 are perspective views showing steps in a process for manufacturing the product of FIG. 1.
Figure 3:
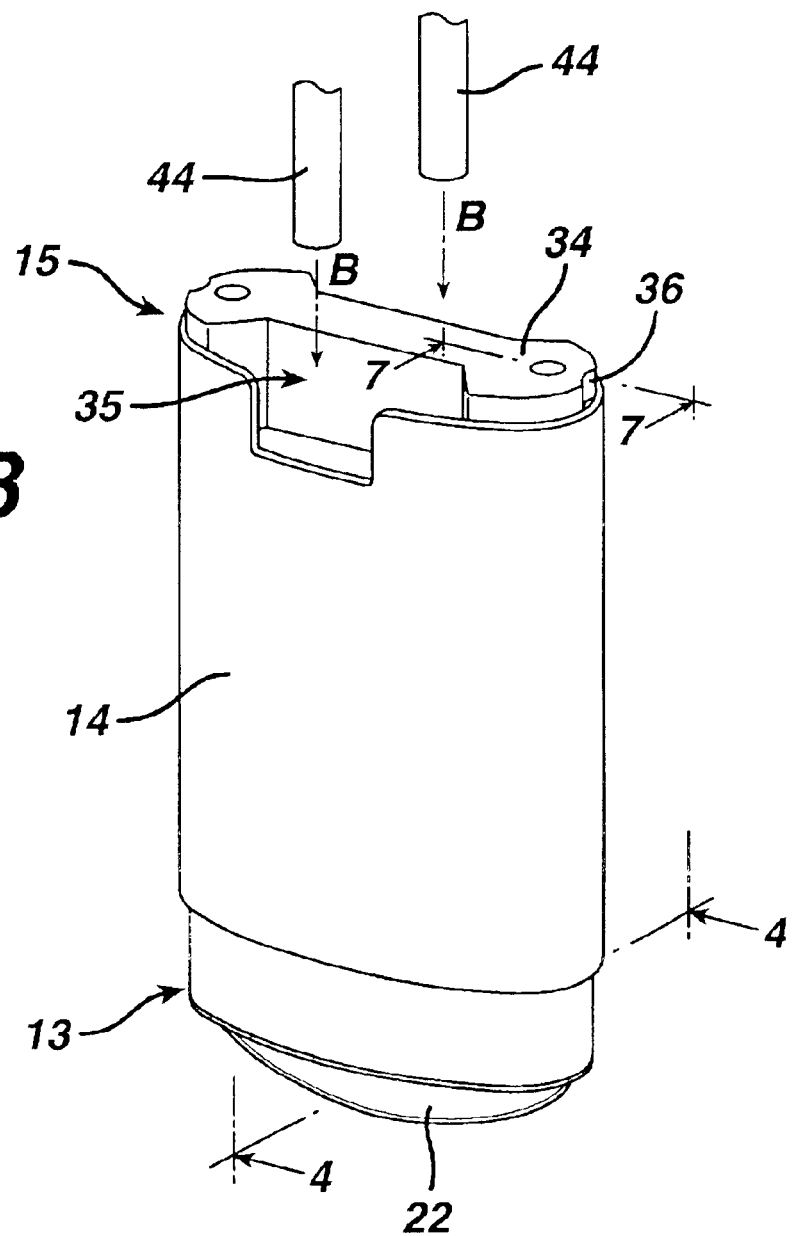
Figure 4:
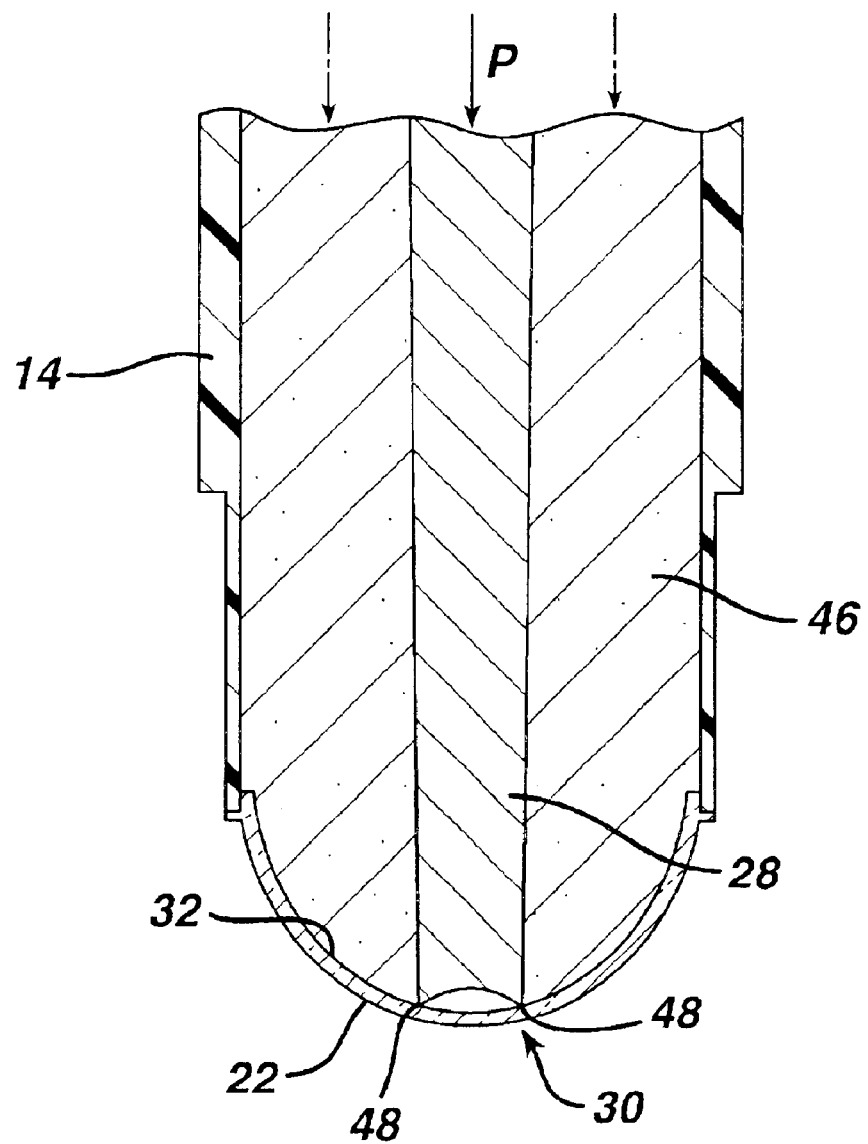
FIG. 4 is a cross-sectional view taken along line 4—4 in FIG. 3.
Figure 5:
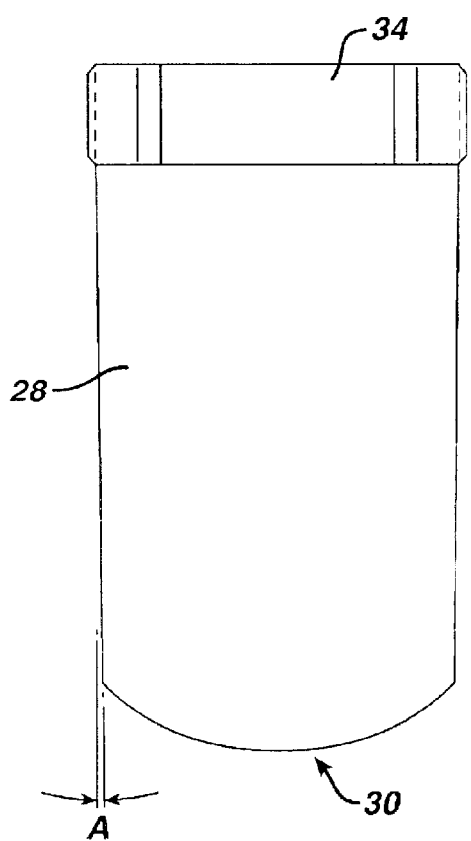
FIGS. 5 and 6 are elevation and side views, respectively, of the insert used in the process of FIGS. 2–4.
Figure 6:
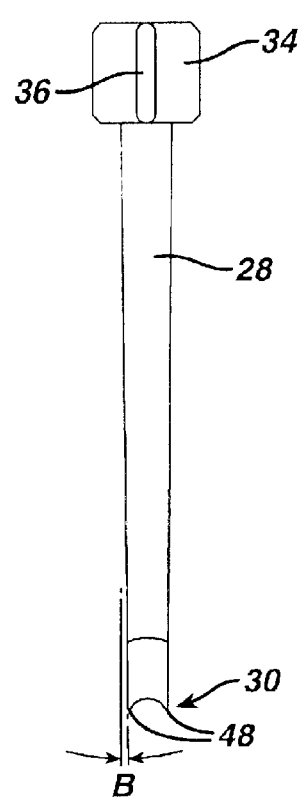

In a first step, shown in FIG. 2, a molding insert 28 is inserted into empty container 14, through opposite end 15 (arrows A), until leading edge 30 of the insert 28 contacts the inner surface 32 of factory seal 22, as shown in FIG. 4. Although the cover 24 is omitted in FIGS. 2–4 and 8–11, for clarity, the cover 24 is in place during the molding process. Cover 24 provides a flat surface on which the container can rest during filling, and also holds the factory seal in place against the downward pressure exerted by the insert 28.

Figure 7:
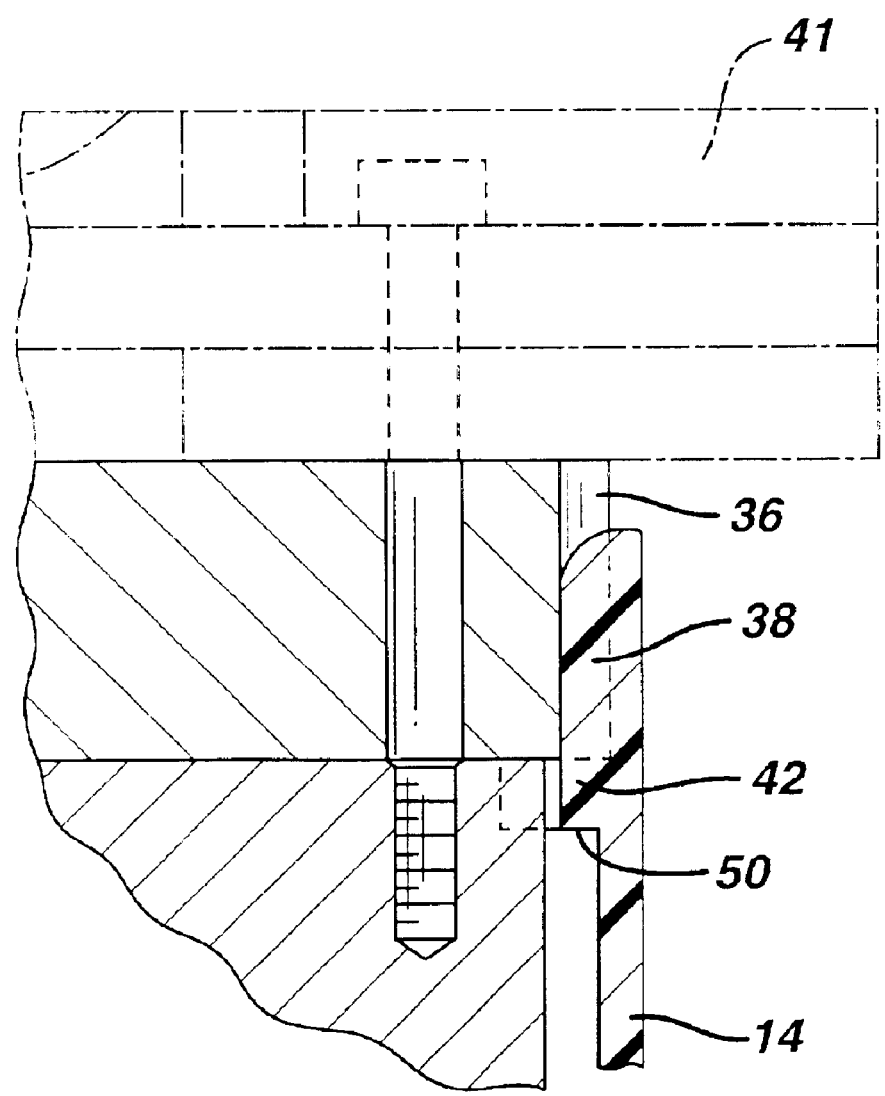
FIG. 7 is an enlarged detail view taken along line 7—7 in FIG. 3.

When the insert 28 is fully inserted, a flange 34 on insert 28 fits snugly within the opposite end 15 of the container, as shown in FIGS. 3 and 7. A pair of grooves 36 on flange 34 is engaged by a pair of ribs 38 on the inner wall 40 of container 14 (FIGS. 2 and 7) to properly orient the insert 28 during insertion. Movement of the insert by automated machinery may be facilitated by a grip member 41, e.g. as shown in phantom lines in FIG. 7.

Next, as shown in FIG. 3, a first fluid antiperspirant composition is delivered to the container, to the open spaces on both sides of insert 28, from nozzles 44, as indicated by arrows B. Flange 34 includes open areas 35 to allow for delivery by nozzles 44. The nozzles are inserted into the container through open areas 35, prior to delivery, and are retracted out of the container as the composition is delivered. The antiperspirant composition is molten, so that it is sufficiently fluid for delivery (e.g., molten composition or flowing gel), but will solidify as it cools.

During delivery of first antiperspirant composition 46, the leading edge 30 of insert 28 is sealed against the inner surface of factory seal 22, to prevent composition 46 from flowing under the leading edge 30. Sealing is provided by the curved surface of leading edge 30, which corresponds closely to the curvature of surface 32 of factory seal 22. Sealing is enhanced by applying downward pressure to the insert 28 during delivery of the first composition 46, as indicated by arrow P, and by pressure ridges 48 on leading edge 30 (the size of which is exaggerated in the figures for clarity), which concentrate this downward force over a relatively small area.

The container 14 is filled to a desired level, for example, about 1.5 inches below the lower surface 50 of detent 42 (FIG. 7) to allow room for a package base that includes advancement device 26 to be inserted into opposite end 15 at a later stage in the manufacturing process. The container 14, filled with first antiperspirant composition 46, is shown in FIG. 4. The first antiperspirant composition 46 is then allowed to solidify sufficiently so that it will not mix with a second fluid antiperspirant composition, for a molten material, typically about 3 to 30 minutes at room temperature, or about 5 to 10 minutes if cooled by forced air. Solidification can be hastened by cooling, e.g., by chilling the insert prior to use.

Figure 8:
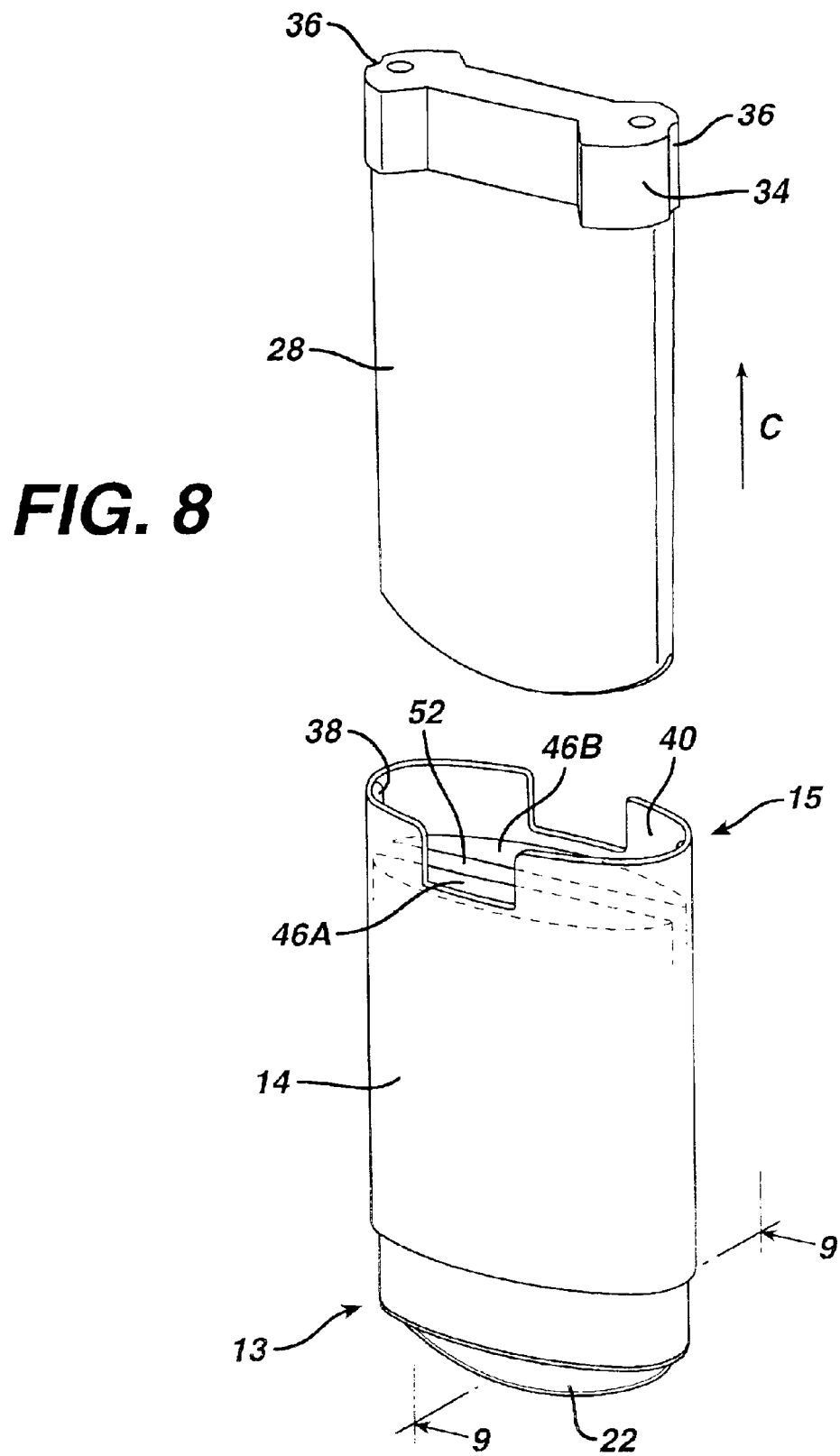
FIG. 8 is a perspective view showing a further step in the manufacturing process of FIGS. 2–3.

When the antiperspirant composition 46 has sufficiently solidified, the insert is removed from the container, as indicated by arrow C in FIG. 8. Removal is facilitated by taper angles A and B of the insert 28, shown in FIGS. 5 and 6. Taper angles A and B are selected to minimize the vacuum that tends to be created as the insert is pulled upward; these angles are each typically 0.25 to 0.75 degree. The insert 28 is generally formed of a very smooth material, to reduce friction as the insert is removed. Suitable materials include metals, e.g., aluminum alloys and highly polished stainless steels, and coated metals, for example stainless steel coated with titanium nitride, chromium, or electroless nickel with a polytetrafluoroethylene (PTFE) infusion, or aluminum coated with aluminum oxide hardcoat anodizing, hardcoat anodizing with a PTFE infusion, or electroless nickel with or without a PTFE infusion, or plated with nickel or chrome. Other suitable materials include plastics such as polypropylene, polyethylene and PET, and silicone-coated plastics. Coatings will generally improve the release properties of the insert, and in the case of metals will improve corrosion resistance and surface hardness.

If desired, the solidified first composition can be held in place, and/or the surface of insert 28 can be scraped, during removal of the insert (these steps are not shown).

Figure 9:
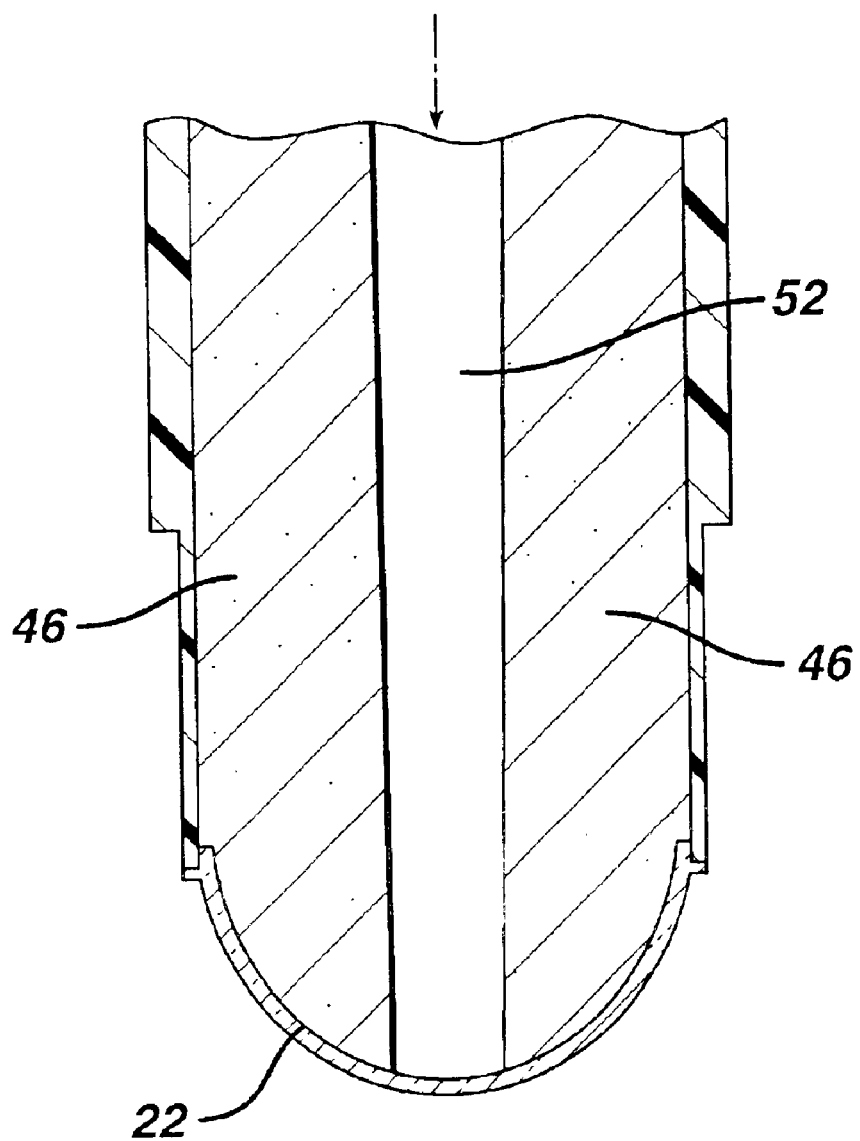
FIG. 9 is a cross-sectional view taken along line 9—9 in FIG. 8.

As shown in FIGS. 8 and 9, removal of the insert 28 leaves an open space 52 in the solidified first composition 46, between two regions 46A and 46B of the solidified first composition that will define regions 18A and 18B (FIG. 1A) of first portion 18 in the finished product.

Figure 10:
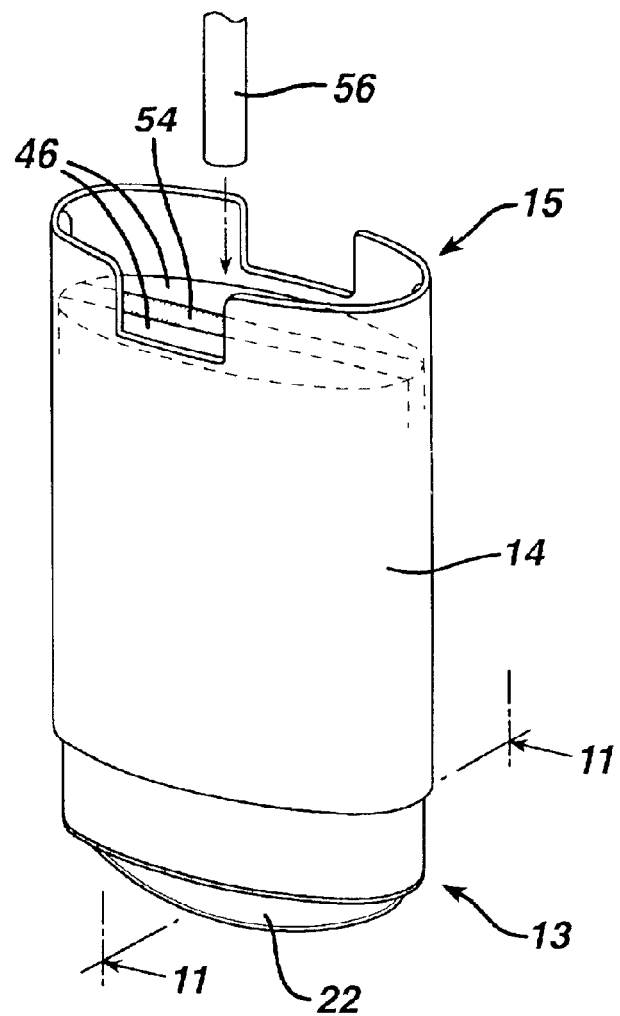
FIG. 10 is a perspective view showing a further step in the manufacturing process of FIGS. 2–3 and 9.
Figure 11:
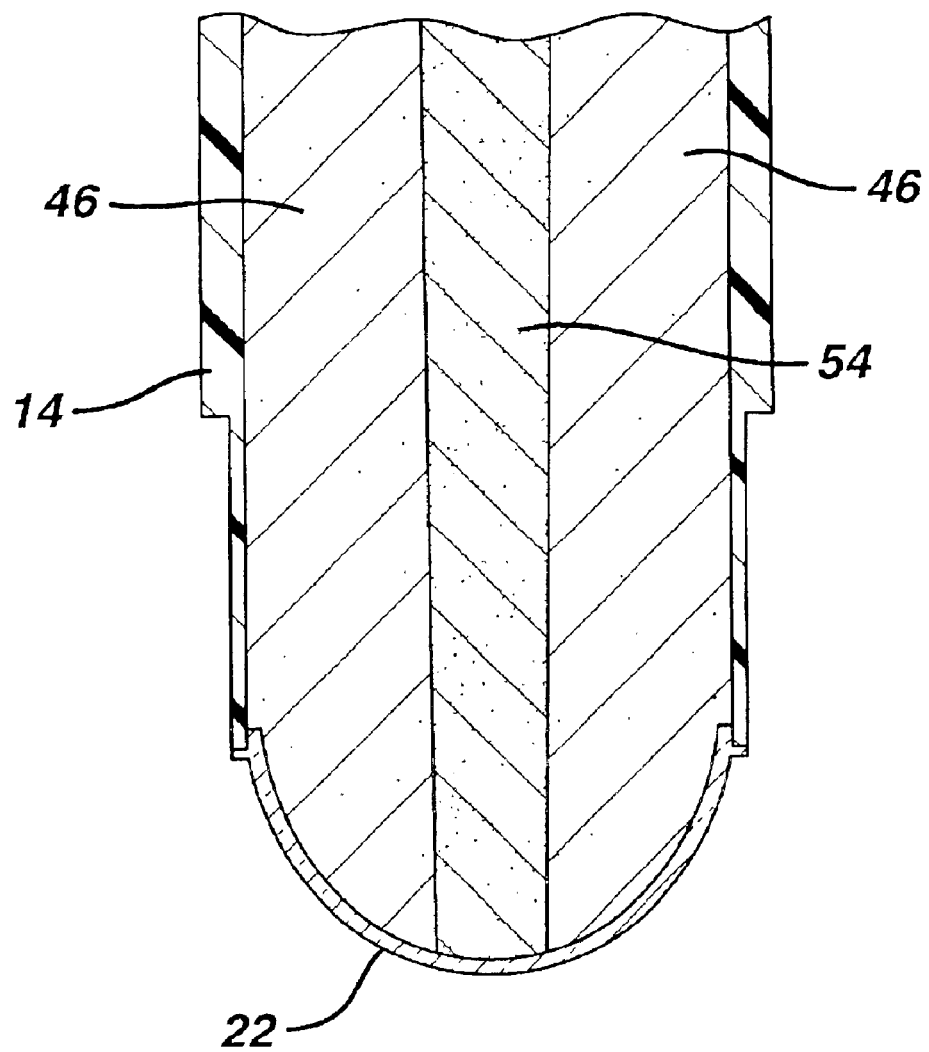
FIG. 11 is a cross-sectional view taken along line 11—11 in FIG. 10.

As shown in FIGS. 10 and 11, after the insert 28 has been removed, a second antiperspirant composition 54 is delivered to the open space 52 from a nozzle 56, as indicated by the arrow in FIG. 10. After solidification, the second antiperspirant composition 54 will define second portion 20 of the finished product. This step completes the molding process. The finished product (FIG. 1) is completed by sealing the open opposite end 15 with a package base (not shown) that includes advancement device 26, and applying a label to the container if desired. In some cases, for example, when the composition is a wax-based solid, second portion 20 is solidified after the base and advancement mechanism have been put in place. As noted above, although cover 24 has been omitted in FIGS. 2–4 and 8–11, it has been in place throughout the molding process.

Figure 12:
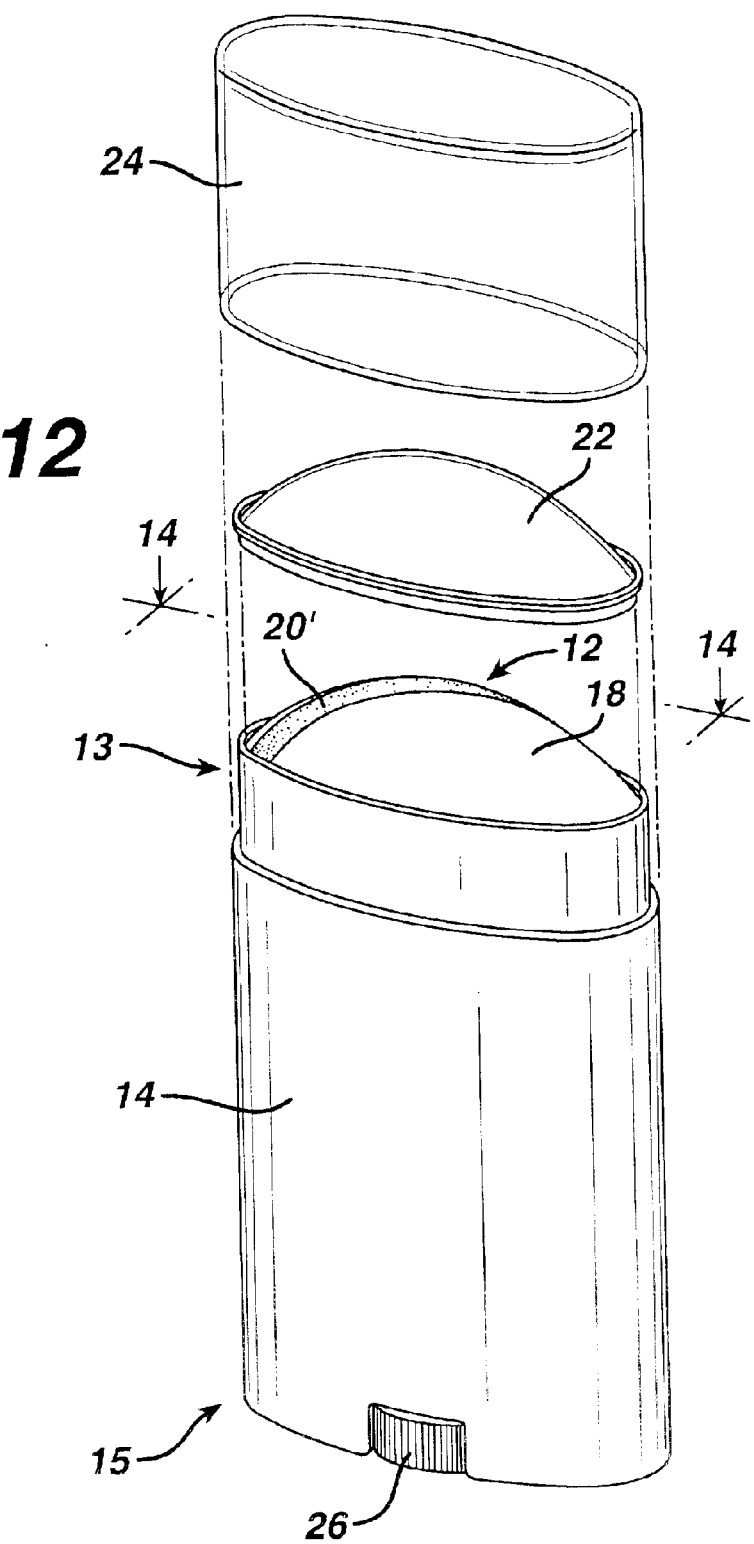
FIG. 12 is an exploded perspective view of a second antiperspirant product.
Figure 14:
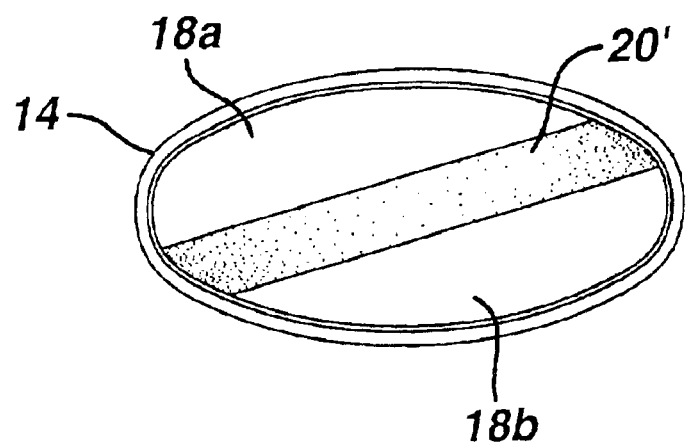
FIG. 14 is a top plan view of the product application surface, as indicated by view line 14—14 in FIG. 12.

FIGS. 12 and 14 show a second embodiment, in which the second portion 20' defines a generally diagonal strip extending through the first portion 18. The process used to form this product is the same as that described above, except that insert 28' has a different shape, designed to form an open space that will define the diagonal strip.

Figure 13:
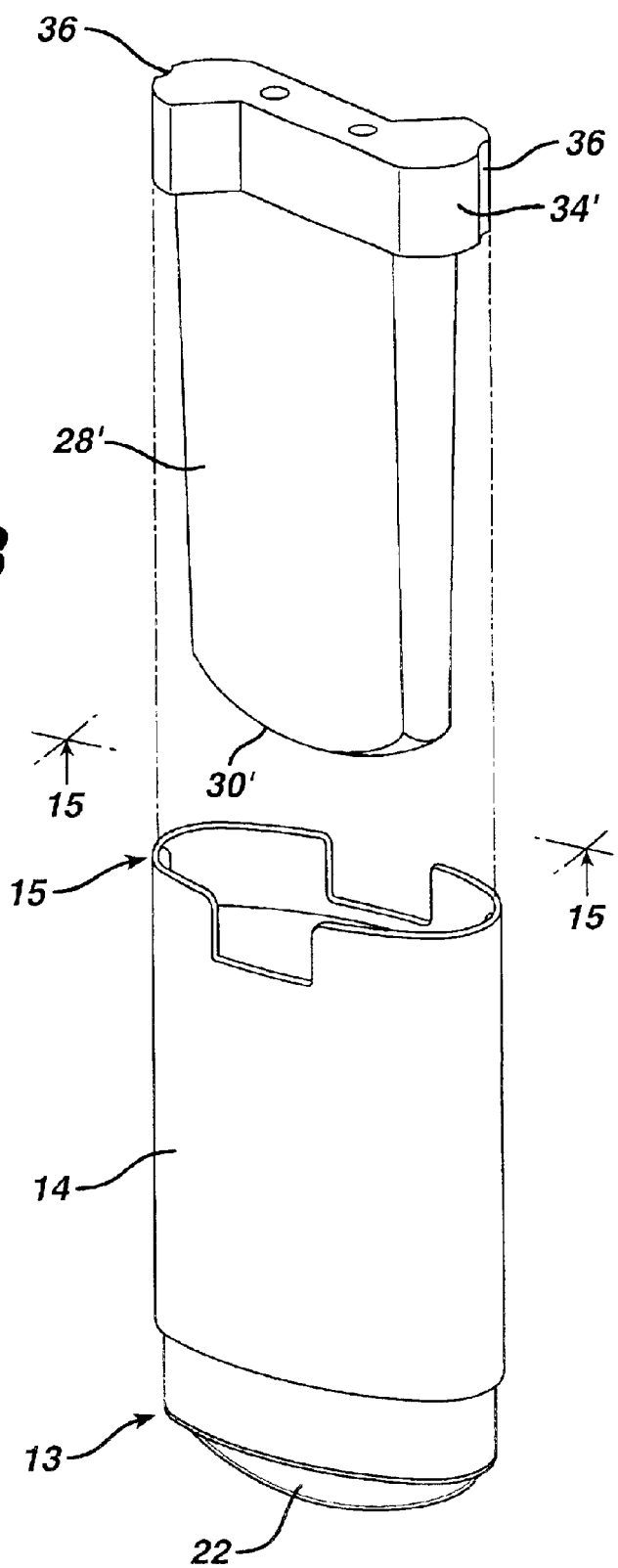
FIG. 13 is a perspective view showing an initial step in a process for manufacturing the product of FIG. 1.
Figure 15:
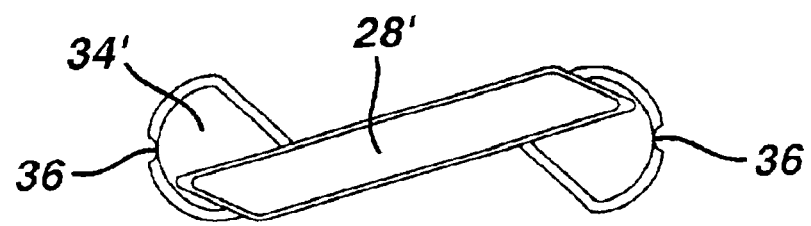
FIG. 15 is an end view of the insert, as indicated by arrows 15—15 in FIG. 13.

The geometry of insert 28' and flange 34' is shown in FIGS. 13 and 15. The insert 28' has a leading edge 30' that defines a complex curve that mirrors the curvature of the inner surface 32 of factory seal 22 as it is contacted by the insert 28' on the diagonal. The complex curve of leading edge 30' is matched to the curvature of surface 32 using commercially available CNC applications, and leading edge 30' is machined using conventional techniques. The leading edge 30' is tangent to the curvature of the inner surface of container 14 and the inner surface 32 of factory seal 22.

Figure 16:
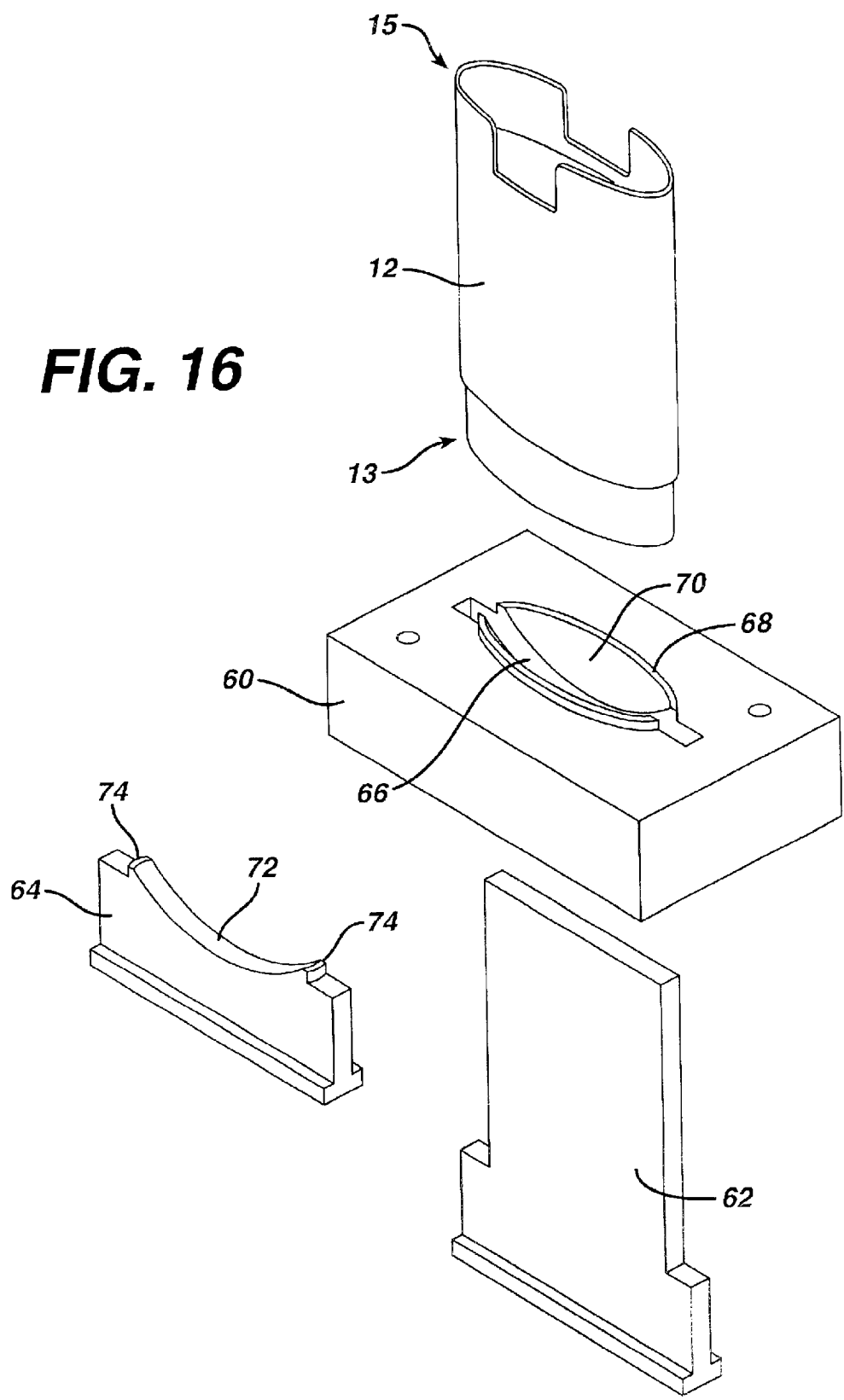
FIG. 16 is an exploded perspective view of parts used in a manufacturing process according to an alternate embodiment, suitable for use in manufacturing the product shown in FIG. 1.

An alternative manufacturing process is shown in FIGS. 16–21. Referring to FIG. 16, the process utilizes a molding plate 60, insert 62, and a filler member 64, to mold the antiperspirant stick within the container 14. Like the process described above, in this alternative process the antiperspirant compositions will be delivered through opposite end 15 of container 14.

Figure 17:
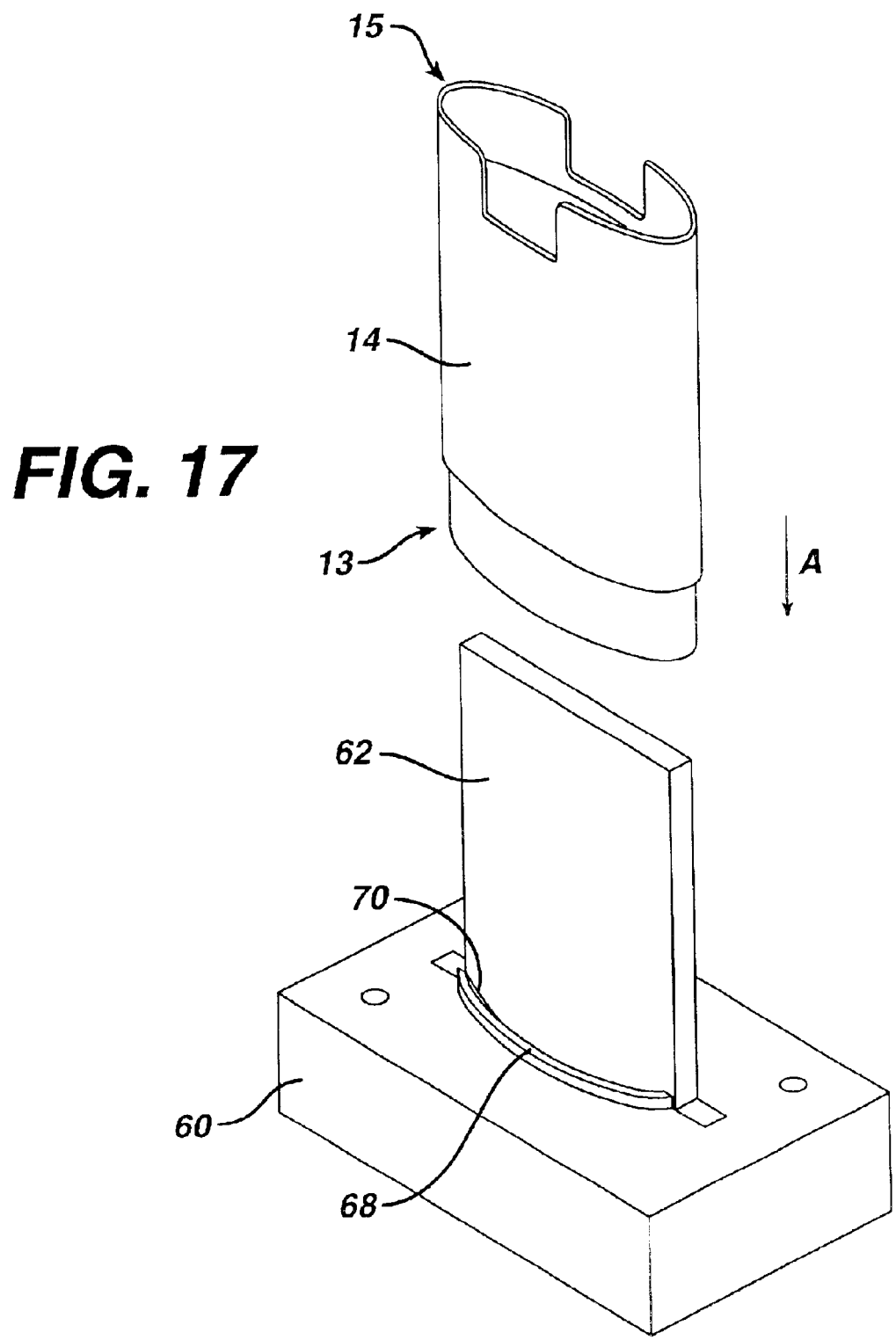
FIGS. 17–21 are perspective views showing steps in the alternative manufacturing process using the parts shown in FIG. 16.

First, as shown in FIG. 17, the insert 62 is inserted into the molding plate 60 through an open slot 66 (FIG. 16) that extends through the thickness of the molding plate, and the application end 13 of container 14 is mounted on the molding plate 60 (arrow A). Application end 13 sealingly engages rim 68 of molding plate 60. Rim 68 surrounds a first portion 70 of the molding plate, that is shaped to mirror the desired shape of the application surface of the finished product (in the embodiment shown, a dome-shaped surface that mirrors dome-shaped surface 16 shown in FIG. 1).

Figure 18:
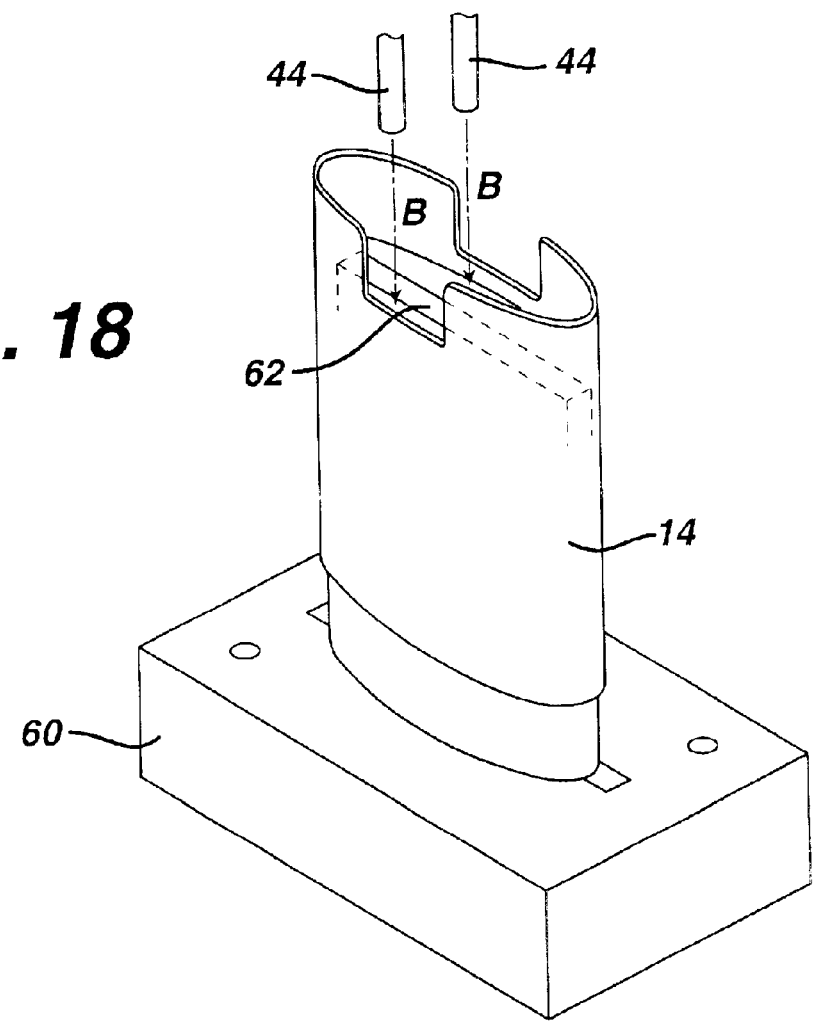
Figure 19:
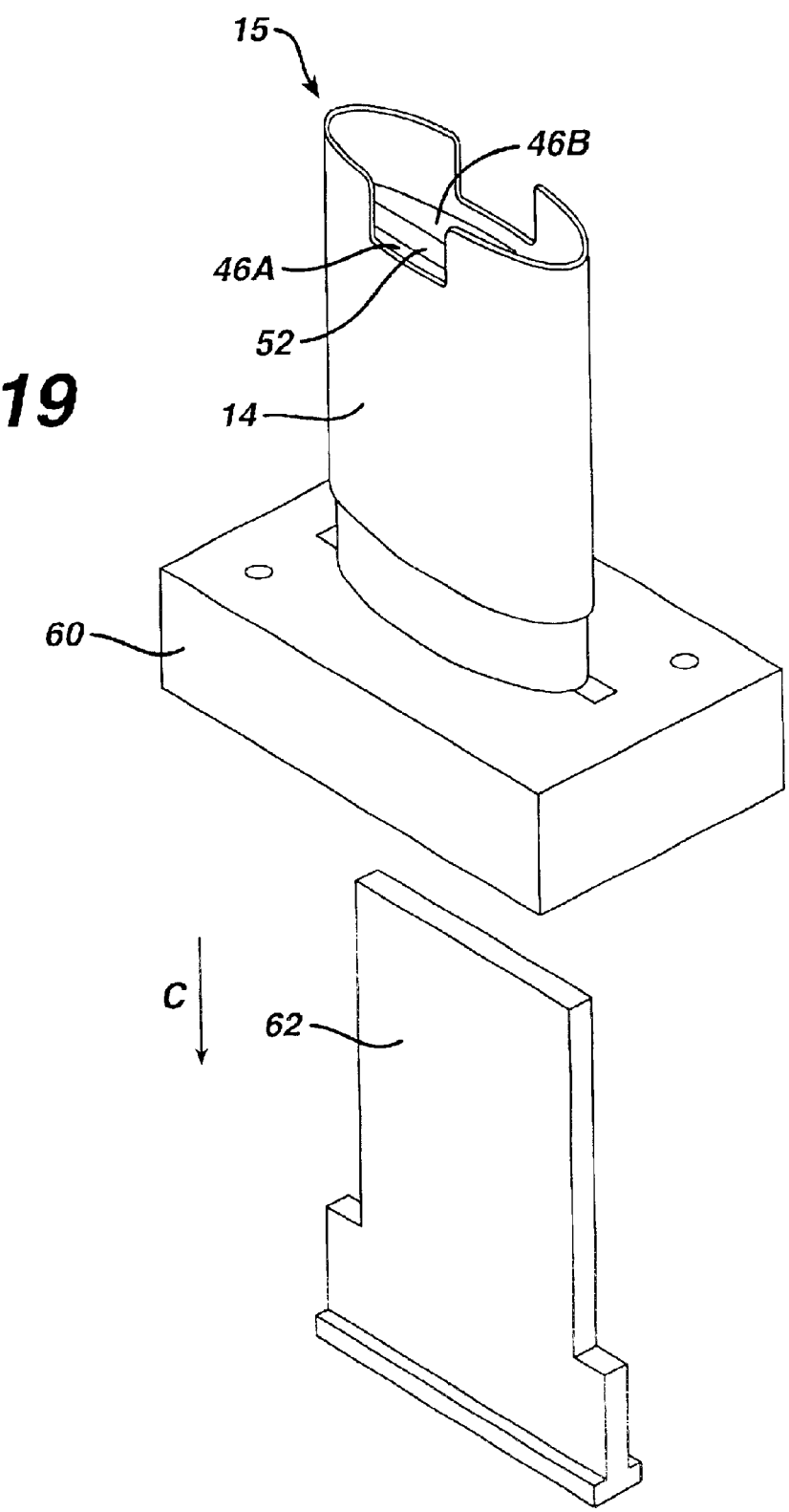

Next, as shown in FIG. 18, first antiperspirant composition 46 is delivered to the spaces on both sides of the insert 62 by nozzles 44, as indicated by arrows B.

As discussed above, when filling is complete the first antiperspirant composition 46 is allowed to at least partially solidify. When sufficient solidification has taken place, the insert 62 is removed by pulling it downward, as indicated by arrow C in FIG. 19, leaving an open space 52 between solidified antiperspirant composition 46A and 46B.

Figure 20:
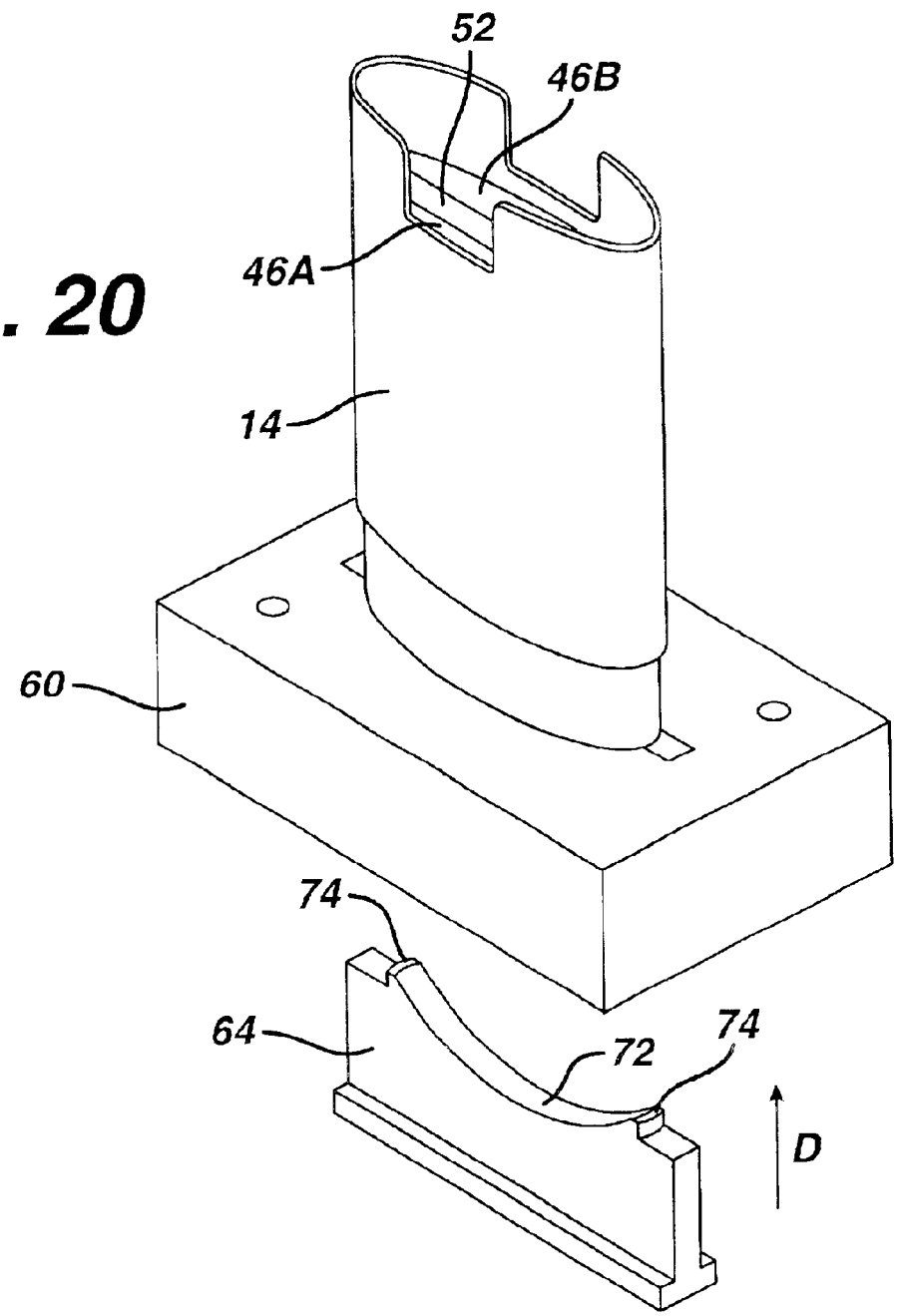
Figure 21:
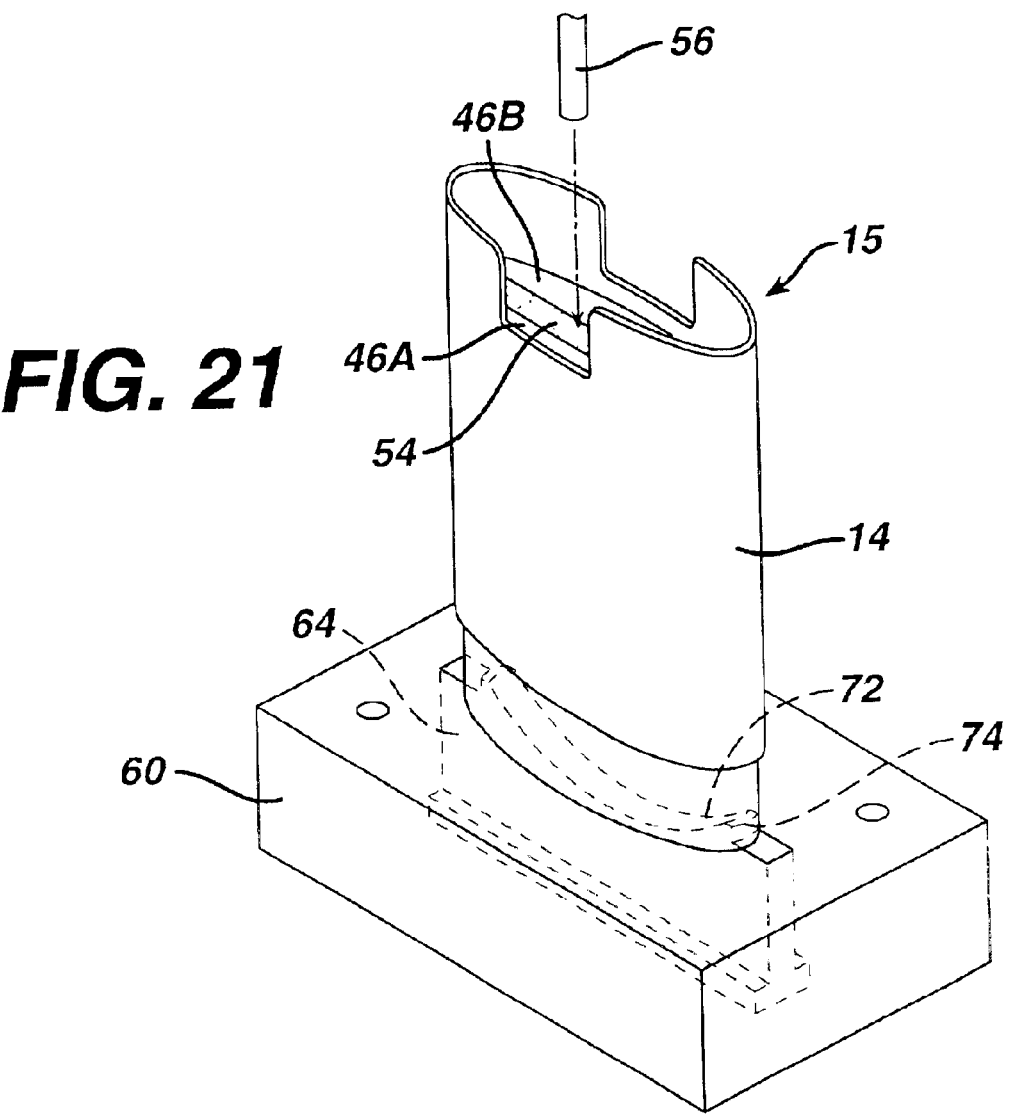

In this embodiment, the open space 52 is in fluid communication with slot 66 in molding plate 60. As a result, before the second antiperspirant composition can be delivered to open space 52 slot 66 must be sealed. Thus, as shown in FIGS. 20 and 21, filler member 64 is inserted into slot 66, as indicated by arrow D in FIG. 20. Filler member 64 includes a curved surface 72 that completes the dome-shaped curvature of first portion 70 of the molding plate 60, and rim portions 74 that seal against the inner wall of container 14, completing the rim 68. (Alternatively, instead of sealing the opening with filler member 64, the partially filled container can be removed from the molding plate 60 at this stage, and the factory seal 22 and cover 24 can be applied to seal the opening.)

When filler member 64 is in place, second antiperspirant composition 54 is delivered to the open space 52 by a nozzle 56, as indicated by the arrow in FIG. 21. This completes the molding process. The finished product (FIG. 1) is completed by sealing the open opposite end 15 with a package base (not shown) that includes advancement device 26, placing cover 24 on the application end 13, and applying a label to the container if desired. In this embodiment, the factory seal is also applied at this time, if a factory seal is desired.

Figure 22:
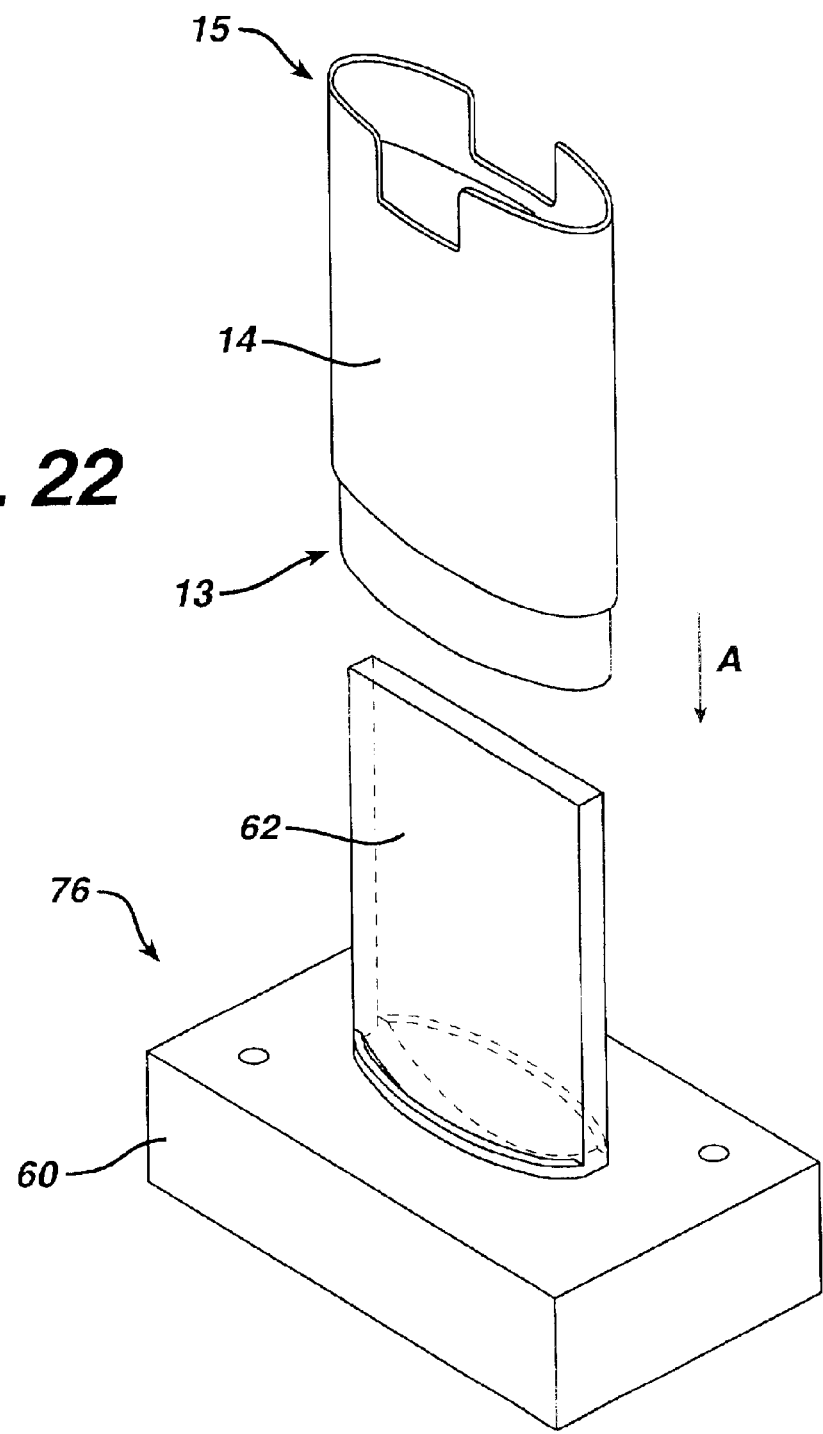
FIG. 22 is a perspective view showing a part used in a further alternate manufacturing process.
Figure 23:
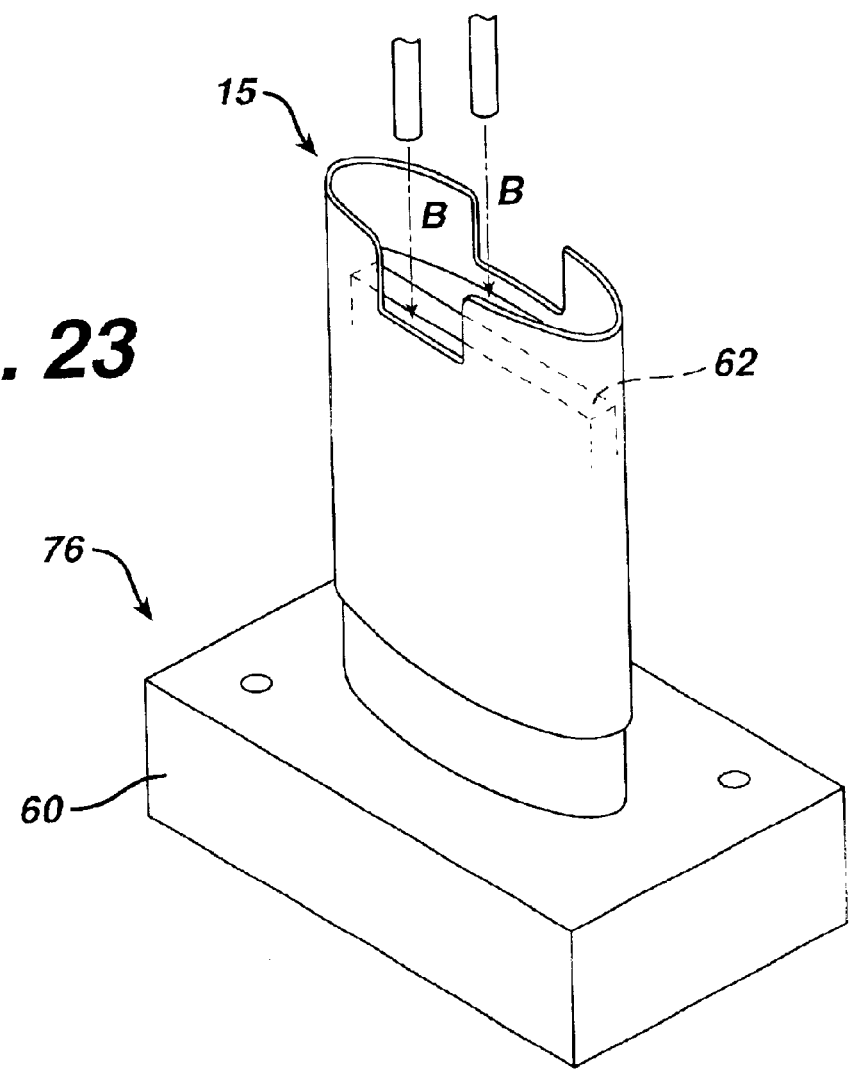
FIGS. 23–25 are perspective views showing steps in the alternative manufacturing process using the part shown in FIG. 22.
Figure 24:
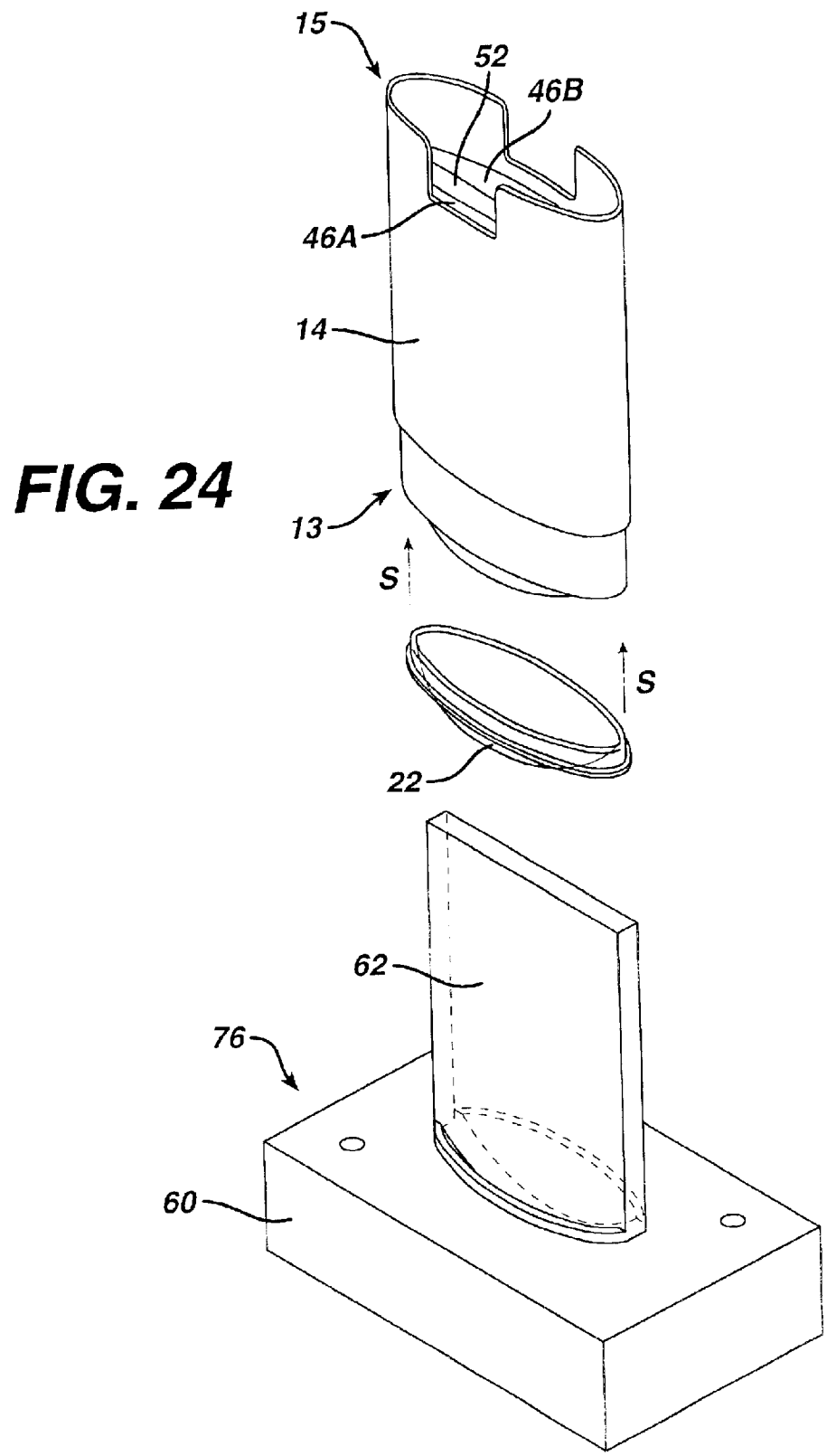
Figure 25:
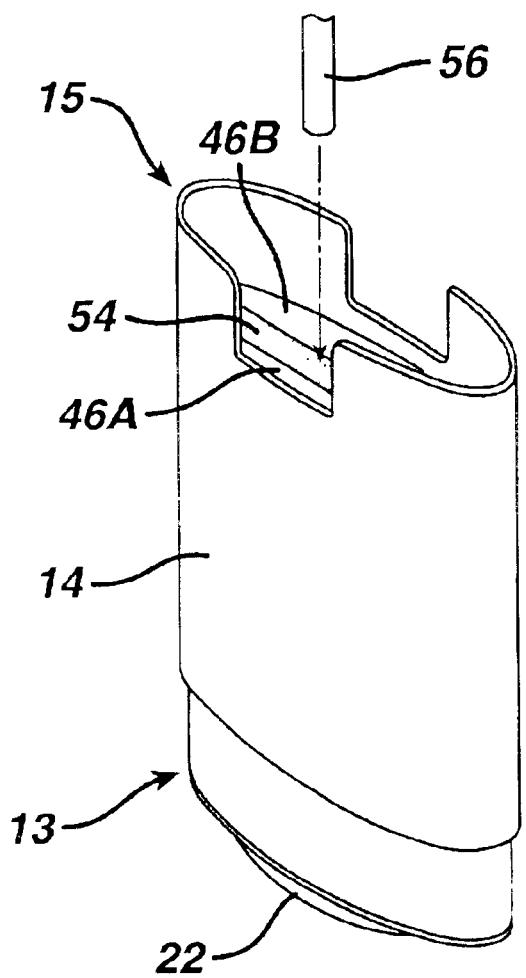

Another alternative process is shown in FIGS. 22–25. In this embodiment, the molding plate 60 and insert 62 described above are provided as a single, unitary molding member 76, shown in FIG. 22. The steps shown in FIGS. 22 and 23 are the same as the steps described above with reference to FIGS. 17 and 18. Once the insert 62 has been removed, as shown in FIG. 24, the open space 52 extends through the container, and must be sealed at the application end 13 of the container before the second antiperspirant composition can be delivered to the open space. This is accomplished by applying the factory seal 22 at this stage in the process, as indicated by arrows S in FIG. 24. Once the factory seal has been applied, the molding process is completed by delivering second antiperspirant composition 54 to the open space 52 by a nozzle 56, as indicated by the arrow in FIG. 25. As discussed above, the finished product (FIG. 1) is completed by sealing the open opposite end 15 with a package base (not shown) that includes advancement device 26, placing cover 24 on the application end 13, and applying a label to the container if desired.

The unitary molding member 76 may, alternatively, include a factory seal-shaped member instead of molding plate 60. In this alternate embodiment, the insert 62 extends integrally from the factory seal-shaped member, and the factory seal-shaped member includes a tab extending from its opposite surface to allow the molding member 76 to be pulled from the container 14.

The materials used to form the insert 28, discussed above, are also suitable for inserts 28' and 62, and for the molding plate 60.

One or both of the portions in the antiperspirant products discussed above may include an antiperspirant salt suspended in an anhydrous, hydrophobic vehicle including a volatile silicone and/or high melting component such as wax.

The preferred antiperspirant salts are aluminum salts and aluminum zirconium salts. Preferred aluminum salts are those having the general formula $Al_2(OH)_{6-a}X_a$ wherein X is Cl, Br, I, or $NO_3$, and a is about 0.3 to about 5, preferably about 0.8 to about 2.5, more preferably about 1 to about 2 (such that the Al to X mole ratio is about 0.9:1 to about 2.1:1). These salts generally have some water of hydration associated with them, typically on the order of 1 to 6 moles per mole of salt. Most preferably, the aluminum salt is aluminum chlorohydrate (i.e. X is Cl in the above formula), especially 5/6 basic aluminum chlorohydrate where a is about 1, such that the aluminum to chlorine mole ratio is about 1.9:1 to 2.1:1. Aluminum chlorohydrate is referred to as "ACH" herein.

Preferred aluminum-zirconium salts are mixtures or complexes of the above-described aluminum salts with zirconium salts of the formula $ZrO(OH)_{4-pb}Y_b$ wherein Y is Cl, Br, I, $NO_3$, or $SO_4$, b is about 0.8 to 4, and p is the valence of Y. The zirconium salts also generally have some water of hydration associated with them, typically on the order of 1 to 7 moles per mole of salt. Preferably the zirconium salt is zirconium hydroxychloride of the formula $ZrO(OH)_{4-b}Cl_b$ wherein b is about 0.8 to 4, preferably about 1.0 to about 4. The aluminum-zirconium salts encompassed by the present invention have an Al:Zr mole ratio of about 2 to about 10, and a metal:X+Y ratio of about 0.73 to about 2.1, preferably about 0.9 to 1.5. A preferred salt is aluminum-zirconium chlorohydrate (i.e. X and Y are Cl), which has an Al:Zr ratio of about 2 to about 10 and a metal:Cl ratio of about 0.9 to about 2.1. Thus, the term aluminum-zirconium chlorohydrate is intended to include the tri-, tetra-, penta- and octa-chlorohydrate forms. Aluminum-zirconium chlorohydrate is referred to as "AZCH" herein. Generally, the aluminum-zirconium antiperspirant salts also contain a neutral amino acid such as glycine, typically in an amount to provide a Zr:Gly ratio of about 1:1 to 4:1.

The preferred ACH and AZCH salts are of the enhanced efficacy type. By "enhanced efficacy salt" is meant an antiperspirant salt which, when reconstituted as a 10% aqueous solution, produces an HPLC chromatogram (as described, for example, in U.S. Pat. No. 5,330,751, which is incorporated herein by reference) wherein at least 50%, preferably at least 70%, most preferably at least 80%, of the aluminum is contained in two successive peaks, conveniently labeled peaks 3 and 4, and wherein the ratio of the area under peak 4 to the area under peak 3 is at least 0.5, preferably at least 0.7, and more preferably at least 0.9 or higher. Particularly preferred, for example, are salts wherein at least 30%, more preferably at least 40%, of the aluminum is contained in peak 4. The aluminum present in peaks 3 and 4 should be of the $Al^c$ type, not $Al^b$, when analyzed by the ferron test. Enhanced efficacy aluminum chlorohydrate is referred to as "ACH'" herein. Enhanced efficacy aluminum-zirconium chlorohydrate is referred to as "AZCH'" herein.

HPLC analysis means that chromatograms were obtained as follows: Salt solutions are evaluated for aluminum polymer distribution by HPLC at a concentration of about 10% Al or Al—Zr salt. If the solution to be analyzed is at a higher salt concentration, it is diluted with sufficient water to bring the salt concentration to about 10%. A 1.0 µL sample is pumped through a 4.6 mm×500 mm column packed with Nucleosil 100-5 silica (Keystone Scientific Inc.) using a 0.01M aqueous nitric acid solution as the eluent. The flow rate of the mobile phase was controlled at 0.5 mL/min with an LDC/Milton Roy ConstaMetric-II metering pump (ThermoQuest Inc). HPLC profiles were recorded and processed which has a computerized system that included the Millennium 32 Chromatography Manager software from the Waters Corp. A Waters 2410 differential refractometer was used as the refractive index detector. The HPLC profiles are read from left to right (higher to lower molecular weight). Following this technique, peak 3 typically appears at a retention time of 11.05–11.26 minutes (kd~0.58–0.62) and peak 4 typically appears at a retention time of 11.91–12.16 minutes (kd~0.69–0.73). Naturally, of course, other HPLC techniques which use different column materials, eluents and flow rates can be used provided that they sufficiently resolve peaks 3 and 4 with an acceptable degree of precision (i.e. the technique must be capable of resolving the Al into as least four distinct peaks). Obviously, such other techniques may place peaks 3 and 4 at different retention times from those given above.

An alternative enhanced efficacy antiperspirant salt are those described in U.S. Ser. No. 09/696,271, filed on Oct. 25, 2000, which has been assigned to the same assignee as the present application and is hereby incorporated by reference. Examples of these salts are aluminum-zirconium tetrachlorohydrate or aluminum-zirconium octochliorohydrate with an HPLC peak 5 area content of at least 45%. These enhanced efficacy salts will be referred to as "$E^5AZCH'$" herein.

In this application, weight percent (USP) of antiperspirant salt is calculated as anhydrous weight percent in accordance with the U.S.P. method. This calculation excludes any bound water and glycine. For aluminum chlorohydrate and aluminum-zirconium chlorohydrate, the calculation is as follows:

%ACH=%Al[26.98x+17.01(3x−1)+35.45]/26.98x where x=Al/Cl ratio;

%AZCH=%Al{26.98y+92.97+17.01[3y+4−(y+1)/z]+35.45(y+1)/z}/26.98y where y=Al/Zr ratio and z=metal/Cl ratio.

For reference purposes, calculation of antiperspirant salt weight percent in accordance with the U.S.P. method compares to the previously used standard industry method is as follows: 50% ACH (std.)=40.8% (USP); 50% AZCH (std)= 38.5% USP.

A portion or both portions of the antiperspirant composition includes the antiperspirant salt in a perspiration reducing effective amount (typically at a concentration of about 3% to about 25% USP active, more typically about 8% to about 22% USP active).

The anhydrous, hydrophobic vehicle comprises about 60% to 95%, preferably about 70% to 90%, of a portion or the portions of the antiperspirant composition. The vehicle generally includes one or more high melting components that melt at 70° C. or higher and/or a volatile silicone.

The high melting components may include any material suitable for use in an antiperspirant stick which melts at a temperature of about 70° C. or higher. Typical of such materials are the high melting point waxes. These include beeswax, spermaceti, carnauba, bayberry, candelilla, montan, ozokerite, ceresin, and paraffin waxes, semimicrocrystalline and microcrystalline waxes, hydrogenated jojoba oil, and hydrogenated castor oil (castor wax). The preferred wax is hydrogenated castor oil. Other suitable high melting components include various types of high melting gelling agents such as polyethylene-vinyl acetate copolymers, polyethylene homopolymers, 12-hydroxystearic acid, and substituted and unsubstituted dibenzylidene alditols. Typically, the high melting components comprise about 1 to 25%, preferably about 2 to 15%, of the composition.

Volatile silicones include the cyclic polydimethylsiloxanes, also known as cyclomethicones, which have from about 3 to about 6 silicon atoms, and the linear polydimethylsiloxanes, also known as dimethicones, which have from about 2 to about 9 silicon atoms. The linear volatile silicones generally have viscosities of less than about 5 centistokes at 25° C. while the cyclic volatile silicones have viscosities under 10 centistokes; an example is DC 200, which is available from Dow Corning Corp. "Volatile" means that the material has a measurable vapor pressure at room temperature. Cyclomethicones include DC 245, DC 344, and DC 345, all of which are also available from Dow Corning Corporation. Volatile silicones are described further in U.S. Ser. No. 09/672,350, filed Sep. 28, 2000, which is assigned to the same assignee as the present application and is hereby incorporated by reference.

Other components may include, for example, non-volatile silicones, polyhydric alcohols having 3–6 carbon atoms and 2–6 hydroxy groups, fatty alcohols having from 12 to 24 carbon atoms, fatty alcohol esters, fatty acid esters, fatty amides, non-volatile paraffinic hydrocarbons, polyethylene glycols, polypropylene glycols, polyethylene and/or polypropylene glycol ethers of C4–20 alcohols, polyethylene and/or polypropylene glycol esters of fatty acids, and mixtures thereof. The term "fatty" is intended to include hydrocarbon chains of about 8 to 30 carbon atoms, preferably about 12 to 18 carbon atoms.

Non-volatile silicones include polyalkylsiloxanes, polyalkylaryl siloxanes, and polyethersiloxanes with viscosities of about 5 to about 100,000 centistokes at 25° C., polymethylphenylsiloxanes with viscosities of about 15 to about 65 centistokes, and polyoxyalkylene ether dimethylsiloxane copolymers with viscosities of about 1200 to about 1500 centistokes.

Useful polyhydric alcohols include propylene glycol, butylenes glycol, dipropylene glycol and hexylene glycol. Fatty alcohols include stearyl alcohol, cetyl alcohol, myristyl alcohol, oleyl alcohol, and lauryl alcohol. Fatty alcohol esters include $C_{12-15}$ alcohols benzoate, myristyl lactate, cetyl acetate, and myristyl octanoate. Fatty acid esters include isopropyl palmitate, myristyl myristate, and glyceryl monostearate. Fatty amides include stearamide MEA, stearamide MEA-stearate, lauramide DEA, and myristamide MIPA.

Non-volatile paraffinic hydrocarbons include mineral oils and branched chain hydrocarbons with about 16 to 68, preferably about 20 to 40, carbon atoms. A preferred material is hydrogenated polyisobutene with about 24 carbon atoms. Suitable polyethylene glycols and polypropylene glycols will typically have molecular weights of about 500 to 6000, such as PEG-10, PEG-40, PEG-150 and PPG-20, often added as rheology modifiers to alter product appearance or sensory attributes.

Polyethylene and/or polypropylene glycol ethers or $C_{4-20}$ alcohols include PPG-10 Butanediol, PPG-14 Butyl Ether, PPG-5-Buteth-7, PPG-3-Isostearth-9, PPG-3-Myreth-3, Oleth-10, and Steareth-20. Polyethylene and/or polypropylene glycol esters of fatty acids include PEG-8 Distearate, PEG-10 Dioleate, and PPG-26 Oleate. These are generally added to give emollient properties.

The above list of materials is by way of example only and is not intended to be a comprehensive list of all potential antiperspirant stick components. Other low melting waxes, non-volatile emollients and suitable components are readily identifiable to those skilled in the art. Of course, other ingredients such as colloidal silicas, particulate polyolefins, talcum materials, fragrances, colorants and preservatives may also be included as desired. For example, the composition may include up to about 10% fragrance or about 2% colorant by weight.

Deodorant active ingredients may also be included as desired. A suitable deodorant active is any agent that inhibits, suppresses, masks or neutralizes malodor. These may include (1) antimicrobial or bactericidal agents which kill the bacteria responsible for malodor production, (2) agents which inhibit or suppress or interfere with the bacterial enzymatic pathway that produces malodor, and (3) agents which mask or absorb or neutralize malodor. Fragrances are not considered deodorant active ingredients within the meaning of this application. Examples of such deodorant actives include triclosan, triclocarban, usnic acid salts, zinc phenolsulfonate, b-chloro-D-alanine, D-cycloserine, aminooxyacetic acid, cyclodextrin, sodium bicarbonate. The composition generally may comprise, by weight, about 0.01% to about 10%, preferably about 0.1% to about 6%, deodorant active.

One or both of the portions in the antiperspirant products discussed previously may include the antiperspirant salt dissolved in a polyhydric alcohol liquid carrier like propylene glycol and gelled with a gelling agent such as dibenzylidene sorbitol. This is a preferred approach to providing a product in which one or both portions are clear. Compositions of this type are described in U.S. Pat. No. 5,705,171, which is incorporated by reference herein. A preferred composition as discussed in that patent, includes about 40% to about 95% of the liquid vehicle, about 0.1% to about 5% of the gelling agent, and about 0.5% to about 25% of the antiperspirant salt. About 0.05% to about 3% of a chelating agent may also be included to improve odor and clarity.

The preferred liquid vehicles include those discussed above and in particular the polyhydric alcohols comprising 3–6 carbon atoms and 2–6 hydroxyl groups.

The preferred gelling agents are dibenzylidene alditols. Examples include dibenzylidene sorbitol (DBS), dibenzylidene xylitol, and dibenzylidene ribitol. The aromatic rings in each benzylidene group may be unsubstituted or substituted, as described in U.S. Pat. No. 5,200,174, which is incorporated herein by reference. When substituted, it is preferred that the benzyl ring contain an electron withdrawing group at the meta position. Typical substituted compounds include di(meta-fluorobenzylidene) sorbitol and di(meta-chlorobenzylidene) sorbitol. The preferred gelling agent is dibenzylidene sorbitol (DBS).

The composition may also include one or more of other ingredients discussed previously.

One or both of the portions of the composition may be in the form of a water-in-oil emulsion comprised of an aqueous phase including the antiperspirant salt and an oil phase including a volatile silicone. This is an alternative approach for providing a product in which one or both portions are clear. Clarity is achieved by matching the refractive index of the water phase with the refractive index of the oil phase. Compositions of this type are described in U.S. Pat. No. 5,587,153, which is incorporated by reference herein.

The water phase may include water and other polar species such as the mono- and polyhydric alcohols including discussed previously. The water phase may comprise, for example, between about 70% and about 90% of the composition by weight.

The oil phase may include one or more of the volatile silicones and one or more of the non-volatile silicones discussed previously. The oil phase may comprise, for example, between about 10% and about 30% of the composition by weight.

Other embodiments are within the claims.

For example, while the first and second portions have been shown and described above as a straight or diagonal strip of second portion dividing two regions of first portion, the first and second portions could have any of a number of different configurations. For example, the second portion may have any of the configurations disclosed in copending application U.S. Ser. No. 09/784,487 now U.S. Pat. No. 6,723,269, the disclosure of which was incorporated by reference above, including a plurality of strips extending centrally or diagonally through the first portion, a wavy strip, configurations in which each portion constitutes half of the application surface, and configurations in which the first portion surrounds a generally centrally located second portion.

Moreover, while both the first and second compositions have been described above as antiperspirant compositions, one or the other may include a deodorant active instead of an antiperspirant salt, and/or one or the other may include a different type of active ingredient, e.g., a therapeutic ingredient, or be substantially inert. Also, while the two compositions have been illustrated and described as having different colors, the compositions may be the same color but differ in another way (e.g., the active ingredients included) or one may be colored and the other one may be clear.

Additionally, while the second portion has been shown as extending fully across the antiperspirant stick to the wall of the container, in some embodiments the second portion does not quite extend to the edges of the application surface.

If desired, a raised ridge, shaped to engage leading edge 30 of insert 28, can be included on inner surface 32 of factory seal 22, to further enhance sealing of the insert against the inner surface 32.

The composition may be a deodorant composition including two portions, and the composition may include three, four, or even five portions.

What is claimed is:

1. A method of manufacturing an antiperspirant or deodorant product within a container having an application end and an opposite end, the product having an application surface adjacent the application end, the method comprising:
   (a) delivering a first composition in fluid form through the opposite end of the container to a mold cavity that is defined at least in part by the container, the mold cavity including a removable insert;
   (b) allowing the first composition to at least partially solidify;
   (c) removing the insert from the mold cavity to provide a space; and
   (d) delivering a second composition in fluid form to the space that was occupied by the insert, the second composition contacting the at least partially solidified first composition after delivery without mixing with the at least partially solidified first composition;
   wherein at least one of the first and second compositions includes an antiperspirant salt and/or a deodorant active ingredient.

2. The method of claim 1 wherein a first portion of the mold cavity defines an application surface of the product.

3. The method of claim 2 wherein the first portion is generally dome-shaped.

4. The method of claim 1 further comprising inserting the insert into the container prior to step (a).

5. The method of claim 2 wherein the first portion of the mold cavity comprises a factory seal portion of the container.

6. The method of claim 1 further comprising providing the insert with a flange that fits securely within the opposite end of the container.

7. The method of claim 1 further comprising providing the insert with a taper to allow it to be easily removed.

8. The method of claim 1 further comprising applying downward pressure to the insert during delivery of the first composition.

9. The method of claim 8 further comprising providing the insert with a pressure ridge to sealingly engage an inner surface of the mold cavity.

10. The method of claim 1 wherein the first composition and second composition are different colors.

11. The method of claim 10 wherein the second composition defines a stripe extending through the first composition, when the application surface of the antiperspirant product is viewed from above.

12. The method of claim 1 further comprising (e) allowing the second composition to at least partially solidify.

13. The method of claim 12 further comprising (f) applying a package base to close the opposite end of the container before or after the second composition has at least partially solidified.

14. The method of claim 13 wherein the package base includes an advancement device constructed to advance the antiperspirant product out of the container.

15. A method of manufacturing an antiperspirant or deodorant product having a generally dome-shaped application surface, the method comprising:
   (a) delivering a first composition in fluid form to an open end of a mold cavity, a first portion of the mold cavity defining the dome-shaped application surface, the mold cavity including a removable insert,
   (b) allowing the first composition to at least partially solidify;
   (c) removing the insert from the mold cavity to provide a space; and
   (d) delivering a second composition in fluid form to the space that was occupied by the insert, the second composition contacting the at least partially solidified first composition after delivery without mixing with the at least partially solidified first composition;
   wherein at least one of the first and second compositions includes an antiperspirant salt and/or a deodorant active ingredient.

16. The method of claim 15 wherein the insert includes a curved surface shaped to engage the dome-shaped first portion, and the method further comprises inserting the insert into the container, through the open end thereof, until the curved surface sealingly contacts the dome-shaped surface of the first portion.

17. The method of claim 16 further comprising providing the insert with a pressure ridge to sealingly engage an inner surface of the mold cavity.

18. The method of claim 16 wherein the first composition and second composition are different colors.

19. The method of claim 18 wherein the second composition defines a stripe extending through the first composition, when the application surface of the antiperspirant product is viewed from above.

20. The method of claim 2 wherein the first portion is defined by a mold member constructed to receive the container in sealing engagement.

21. The method of claim 20 wherein the method further comprises mounting the application end on the mold member prior to step (a).

22. The method of claim 20 further comprising, prior to step (a), inserting the insert into the mold cavity through an opening in the mold member, the opening being constructed to be sealed by the insert.

23. The method of claim 22 further comprising, between steps (c) and (d), sealing the opening with a sealing member having a surface constructed to, with the mold member, define the dome-shaped surface of the first portion.

24. The method of claim 20 further comprising, after step (d), (e) allowing the second composition to at least partially solidify, and (f) removing the container from the mold member.

25. The method of claim 24 further comprising, after step (f), (g) applying a factory seal to the application surface of the antiperspirant product.

26. The method of claim 20 wherein the insert extends from and is integral with the mold member.

27. The method of claim 26, further comprising, between steps (c) and (d), applying a factory seal to the application surface of the antiperspirant product.

28. The method of claim 1 wherein the insert comprises a material selected from the group consisting of metals, coated metals, plastics and silicone-coated plastics.

29. The method of claim 1 wherein the insert comprises a coated metal selected from the group consisting of stainless steel coated with titanium nitride, chromium, or electroless nickel with or without a polytetrafluoroethylene (PTFE) infusion; aluminum coated with aluminum oxide hardcoat anodizing, hardcoat anodizing with a PTFE infusion, or electroless nickel with or without a PTFE infusion; or aluminum plated with nickel or chrome.

30. A method of manufacturing an antiperspirant or deodorant product within a container having an application end and an opposite end, the product having an application surface adjacent the application end, the method comprising:
 (a) delivering a first composition in fluid form through the opposite end of the container to a mold cavity that is defined at least in part by the container, the mold cavity including a removable insert;
 (b) allowing the first composition to at least partially solidify;
 (c) removing the insert from the cavity to provide a space; and
 (d) delivering a second composition in fluid form to the space that was occupied by the insert, the second composition contacting the at least partially solidified first composition after delivery;
 wherein at least one of the first and second compositions includes an antiperspirant salt and/or a deodorant active ingredient,
 wherein the insert includes a flange that fits securely within the opposite end of the container, the flange having a taper to allow the insert to be easily removed.

31. The method of claim 30 wherein the first composition and second composition are different colors.

* * * * *